(12) United States Patent
Ishii et al.

(10) Patent No.: US 8,137,047 B2
(45) Date of Patent: Mar. 20, 2012

(54) DOUBLE-ARM WORKING MACHINE

(75) Inventors: Akinori Ishii, Ushiku (JP); Kazuo Fujishima, Kasumigaura (JP); Kunitsugu Tomita, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 550 days.

(21) Appl. No.: 11/909,782

(22) PCT Filed: Jan. 11, 2007

(86) PCT No.: PCT/JP2007/050253
§ 371 (c)(1),
(2), (4) Date: Sep. 26, 2007

(87) PCT Pub. No.: WO2007/138755
PCT Pub. Date: Dec. 6, 2007

(65) Prior Publication Data
US 2010/0183416 A1    Jul. 22, 2010

(30) Foreign Application Priority Data
May 31, 2006  (JP) ................................. 2006-151455

(51) Int. Cl.
*E02F 3/43* (2006.01)
(52) U.S. Cl. ........................... 414/699; 701/50; 700/213
(58) Field of Classification Search .................. 414/680, 414/699; 701/50; 700/213
See application file for complete search history.

(56) References Cited

U.S. PATENT DOCUMENTS 6,230,090 B1 *  5/2001  Takahashi et al. .............. 701/50
7,717,664 B2 *  5/2010  Bitter et al. .................... 414/699

FOREIGN PATENT DOCUMENTS

| JP | 63-52991 | 3/1988 |
| JP | 11-181815 | 7/1999 |
| JP | 2001-173026 | 6/2001 |
| JP | 2006-070456 | 3/2006 |

* cited by examiner

*Primary Examiner* — Donald Underwood
(74) *Attorney, Agent, or Firm* — Mattingly & Malur, PC

(57) ABSTRACT

A double-arm working machine has an upper swing structure, an operator cabin, left swing post and right swing post provided in front of the upper swing structure, and a left work front A and right work front B provided on the left swing post and the right swing post, respectively, such that the work fronts A, B each sway vertically. An interference prevention controller generates an output signal to swing the swing posts $7a$, $7b$ pursuant to a differential angle between the left and right work fronts A, B and to a command signal from an operating device. A differential angle range in which the left and right work fronts A, B are likely to come into contact with each other is defined as an interference danger area (N), and an assigned differential-angle range contiguous to the interference danger area is defined as a semi-interference danger area.

5 Claims, 15 Drawing Sheets

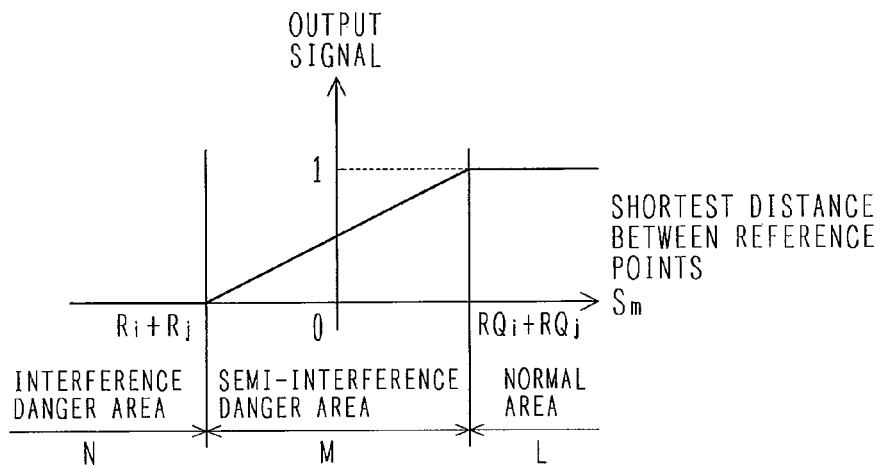
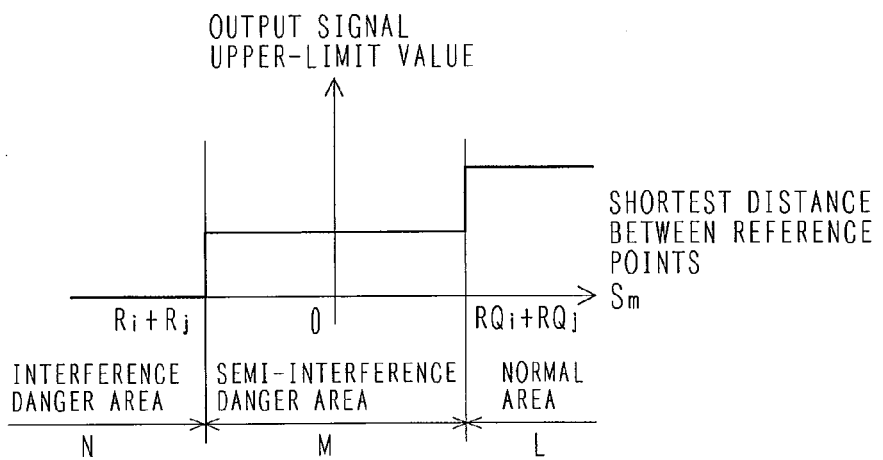
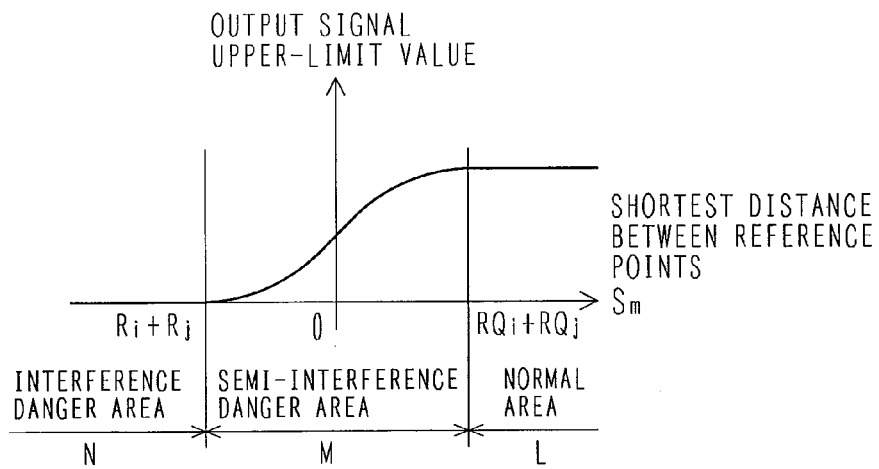

DOUBLE-ARM WORKING MACHINE

TECHNICAL FIELD

The present invention relates generally to working machines used for structure dismantling work, waste dismantling work, road work, construction work, civil engineering work, and the like. More particularly, the invention concerns a double-arm working machine having two multi-articulated work fronts.

BACKGROUND ART

General hydraulic excavators are constructed so that the multi-articulated type of work front that includes a boom and an arm is coupled to an upper bodywork so as to look up and down and so that the arm has a vertically swayable bucket at its distal end. Instead of the bucket, however, a breaker, a crusher, a grapple, or the like may be mounted to construct a working machine intended for structure dismantling work, waste dismantling work, civil engineering/construction work, and/or the like. This kind of working machine typically has one work front. However, working machines with two work fronts have been proposed in recent years. With the two work fronts, it is possible to carry out various operations that have been difficult to perform with a conventional single-front working machine alone, such as dismantling an object with one work front while gripping the object with the other work front. Accordingly, double-arm working machines are advantageous over conventional single-arm working machines in terms of operational stability and efficiency (refer to, for example, Patent Document 1 for further details of the conventional single-arm working machines).
Patent Document 1: JP-A-11-181815

DISCLOSURE OF THE INVENTION

Problems to be Solved by the Invention

For such a double-arm working machine as outlined above, however, if the left work front and the right work front are constructed so that a part of each overlaps a part of the other in operational radius, swinging either the left or right work front or both thereof for a shorter relative distance between the two work fronts may bring the work fronts into contact with each other. Depending on the particular swinging radii of the two work fronts, contact therebetween could result in both work fronts being damaged.

The present invention has been made in consideration of the above, and an object of the invention is to provide a double-arm working machine capable of preventing damage to both left and right work fronts thereof due to interference between the left and right work fronts.

Means for Solving the Problems

In order to fulfill the above object, the present invention provides, as a first aspect thereof, a double-arm working machine including: a lower travel structure with a travel device; an upper bodywork provided at an upper section of the lower travel structure and having an operator cabin; left and right swing posts provided on front left and right sides of the upper bodywork such that the swing posts each swing in both leftward and rightward directions; left and right work fronts provided on the left and right swing posts such that the work fronts each sway vertically; and operating devices that give operational instructions to the swing posts and the work fronts. The above working machine further includes angle sensors that sense swinging angles of the left and right swing posts, and interference prevention controllers that generate output signals to swing the swing posts, pursuant to differential angles between the left and right work fronts that have been calculated from sensor signals sent from the angle sensors, and to command signals from the operating devices. The interference prevention controllers are constructed such that: the controllers define, as an interference danger area, a differential angle range in which the left and right work fronts are likely to come into contact with each other; the controllers define, as a semi-interference danger area, a differential angle area adjacent to the interference danger area and in which the left and right work fronts, although kept free from contact under a stopped state thereof, are liable to come into contact when operated to make relative approaches; and when the differential angles between the left and right work fronts, calculated from the angle sensor signals, are in the semi-interference danger area and the work fronts are operated to make relative approaches, the controllers output a signal to reduce the swinging speed of either swing post.

The present invention provides, as a second aspect thereof, a double-arm working machine including: a lower travel structure with a travel device; an upper bodywork provided at an upper section of the lower travel structure and having an operator cabin; left and right swing posts provided on front left and right sides of the upper bodywork such that the swing posts each swing in both leftward and rightward directions; left and right work fronts provided on the left and right swing posts such that the work fronts each sway vertically; and operating devices that give operational instructions to the swing posts and the work fronts. The above working machine further includes angle sensors that sense swinging angles of the left swing post and the right swing post, angle sensors that sense vertical pivoting angles of the left work front and the right work front, and interference prevention controllers that generate output signals to swing the swing posts, pursuant to differential angles between both work fronts that have been calculated from sensor signals sent from each of the two kinds of angle sensors, to postures of the work fronts, and to command signals from the operating devices. The interference prevention controllers are constructed such that: the controllers define, as an interference danger area, the differential angle range in which the left work front and the right work front are likely to come into contact with each other, depending on the shortest distance between any two reference points of all reference points provided on the left work front and the right work front; the controllers define, as a semi-interference danger area, an area adjacent to the interference danger area and in which both work fronts, although kept free from contact under a stopped state thereof, are liable to come into contact when operated to make relative approaches; and when the shortest distance between both work fronts, calculated from the angle sensor signals, are in the semi-interference danger area and the work fronts are operated to make relative approaches, the controllers output a signal to reduce the swinging speed of either swing post.

A third aspect of the present invention is that in the first or second aspect thereof, the interference prevention controllers are constructed such that when a positional relationship between both work fronts, calculated from the sensor signals sent from the angle sensors, exists in the semi-interference danger area and the work fronts are operated to make relative approaches, the controllers increase slowdown rates of the work fronts continuously or stepwise as the work fronts move closer to each other.

A fourth aspect of the present invention is that in any one of the first to third aspects thereof, the interference prevention controllers are constructed such that when a positional relationship between both work fronts, calculated from the sensor signals sent from the angle sensors, exists in the semi-interference danger area and an operating signal associated with an approaching direction of either of the work fronts is input from either of the operating devices, the controllers avoid interference between the work fronts by stopping the approaching operation of either work front.

A fifth aspect of the present invention is that in any one of the first to third aspects thereof, the interference prevention controllers are constructed such that when a positional relationship between both work fronts, calculated from the sensor signals sent from the angle sensors, exists in the semi-interference danger area and an operating signal associated with an approaching direction of either of the work fronts is input from either of the operating devices, the controllers avoid interference between the work fronts by changing the operating direction of either work front.

Effects of the Invention

According to the present invention, damage to the left work front and the right work front can be prevented since relative speeds at which the work fronts approach each other can be reduced in the semi-interference danger area.

BRIEF DESCRIPTION OF THE DRAWINGS

FIG. 21 is a diagram showing yet another example of a relationship between the interference prevention controller output signal level and shortest distance from one reference point to another, obtained for the left/right work front during swinging thereof for relative approaching in the double-arm working machine according to the second embodiment of the present invention;

FIG. 22 is a diagram showing a further example of a relationship between the interference prevention controller output signal level and shortest distance from one reference point to another, obtained for the left/right work front during swinging thereof for relative approaching in the double-arm working machine according to the second embodiment of the present invention;

FIG. 23 is a diagram showing a further example of a relationship between the interference prevention controller output signal level and shortest distance from one reference point to another, obtained for the left/right work front during swinging thereof for relative approaching in the double-arm working machine according to the second embodiment of the present invention.

DESCRIPTION OF REFERENCE NUMERALS

Figure 1:
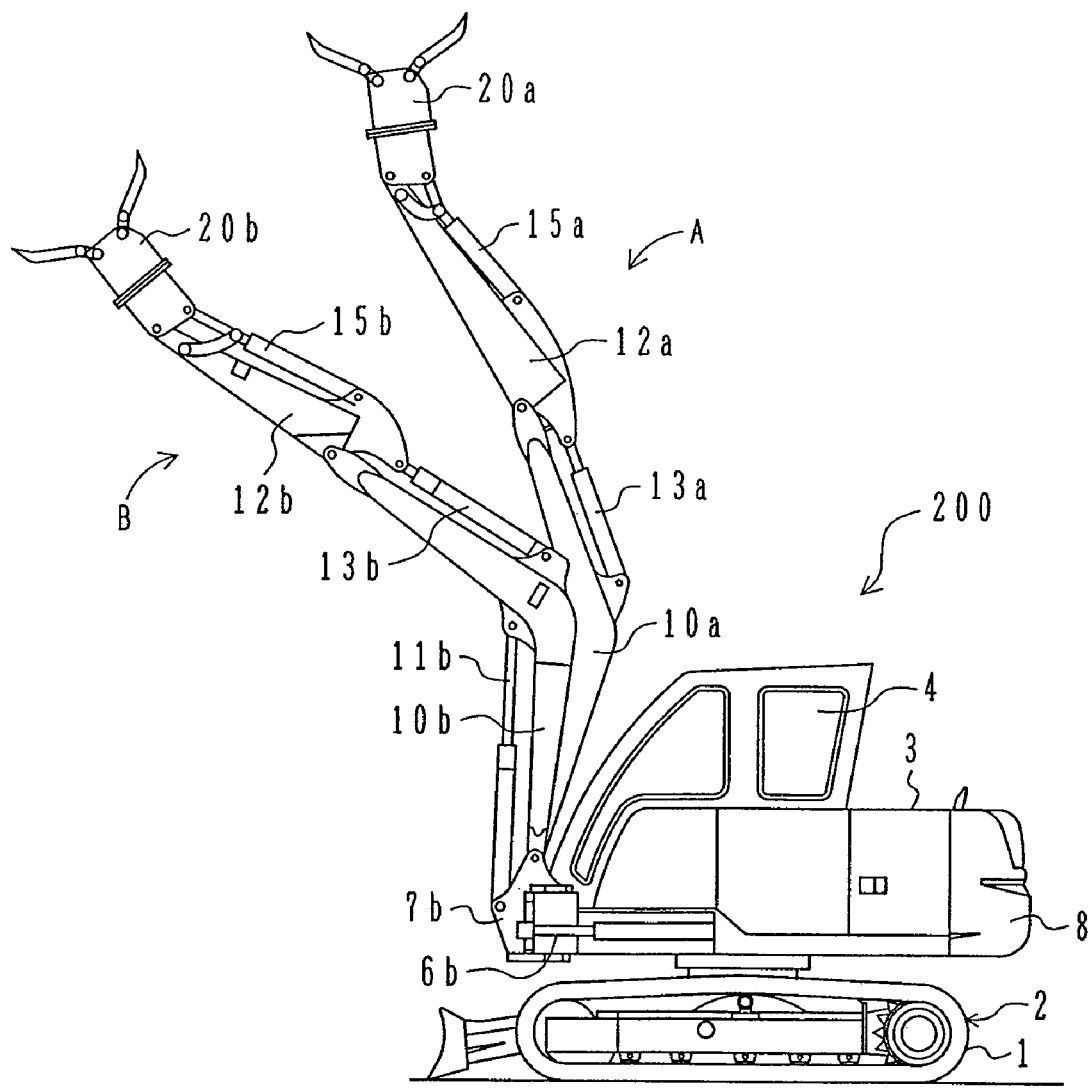
FIG. 1 is a side view that shows external appearance of a double-arm working machine according to a first embodiment of the present invention.

1 Travel device
2 Lower travel structure
3 Upper swing structure
4 Operator cabin
7a,b Swing post
50a,b Operating device
57a,b Control arm position change sensor
60a,b Attachment control switch position change sensor
61F Interference prevention controller
61FA Interference prevention controller
67a,b Swing post angle sensor
68a,b Boom angle sensor
69a,b Arm angle sensor
70a,b Attachment angle sensor
110 Interference preventing switch
581a,b Control lever vertical position change sensor
582a,b Control lever longitudinal position change sensor
583a,b attachment-turning lever position change sensor
A,B Work front
L Normal area
M Semi-interference danger area
N Interference danger area
Sm Shortest distance between reference points
θc Differential angle

BEST MODE FOR CARRYING OUT THE INVENTION

Embodiments of the present invention will be described below using the accompanying drawings.

First Embodiment

<Mainframe Configuration>

Figure 2:
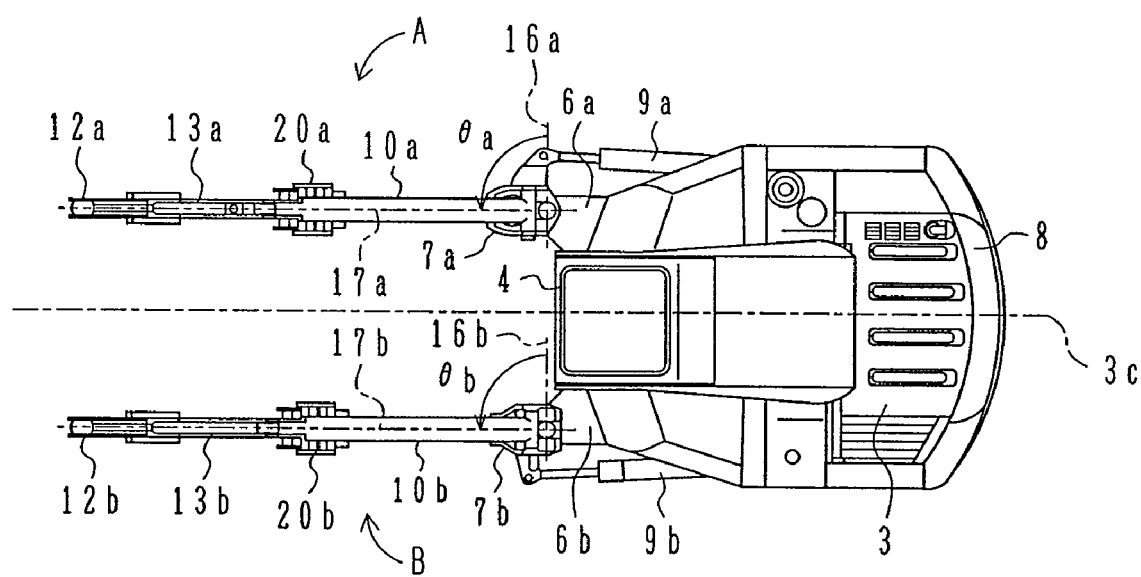
FIG. 2 is a plan view that shows the external appearance of the double-arm working machine according to the first embodiment of the present invention.

FIG. 1 is a side view that shows external appearance of a double-arm working machine according to a first embodiment of the present invention. FIG. 2 is a plan view of the double-arm working machine. Upper, lower, left, and right sections of the machine in FIG. 2 are referred to as the right, left, front, and rear, respectively, of the machine in the description given below. Similarly, vertical and horizontal directions of the machine in FIG. 2 are referred to as lateral and longitudinal directions, respectively, of the machine in the description given below.

As shown in FIGS. 1 and 2, the double-arm working machine of the present embodiment is constructed to include an upper swing structure 3 pivotally installed on a lower travel structure 2 which has a travel device 1, and an operator cabin 4 installed almost centrally in a longitudinal direction of the upper swing structure 3. The upper swing structure 3 has, across a centerline 3c thereof, a first bracket 6a at a forward right corner of the cabin 4, and a second bracket 6b at a forward left corner of the cabin. Also, a power unit 8 with built-in elements such as an engine and pump is disposed in a lateral and rear partition of the cabin 4, inside the upper swing structure 3.

<Configuration of a First Work Front>

A swing type of first work front A is installed on the first bracket 6a. The first work front A has: a swing post 7a installed on the first bracket 6 so as to be laterally swayable about a vertical axis of the bracket; a boom 10a installed on the swing post 7a so as to be swayable vertically; an arm 12a installed on the boom 10a so as to be swayable vertically; a grapple 20a installed as a first working attachment on the arm 12a so as to be pivotable vertically; a swaying cylinder 9a coupled to the swing post 7a and the upper swing structure 3 in order to sway the swing post 7a laterally about a vertical axis of the cylinder; a boom cylinder 11a (not shown; see the following description of a boom cylinder 11b of a second work front B) that is coupled to the swing post 7a and the boom 10a in order to sway the boom 10a vertically: an arm cylinder 13a coupled to the boom 10a and the arm 12a in order to sway the arm 12a vertically; and a working attachment cylinder 15a coupled to the arm 12a and the grapple 20a in order to turn the grapple 20a vertically.

The grapple 20a is arbitrarily replaceable with other working attachments such as a bucket, breaker, and crusher.

<Configuration of a Second Work Front>

A second work front B is installed on the front right side of the upper swing structure 3. The second work front B essentially of the same configuration as that of the first work front A, is constructed to be left/right symmetric with respect to the first work front A. Members of the second work front B that function the same as those of the first work front A are each denoted with a suffix "b", instead of "a" in the reference numbers and symbols assigned to the first work front A, and description of such members is omitted herein.

<Configuration of Operating Devices>

Figure 3:
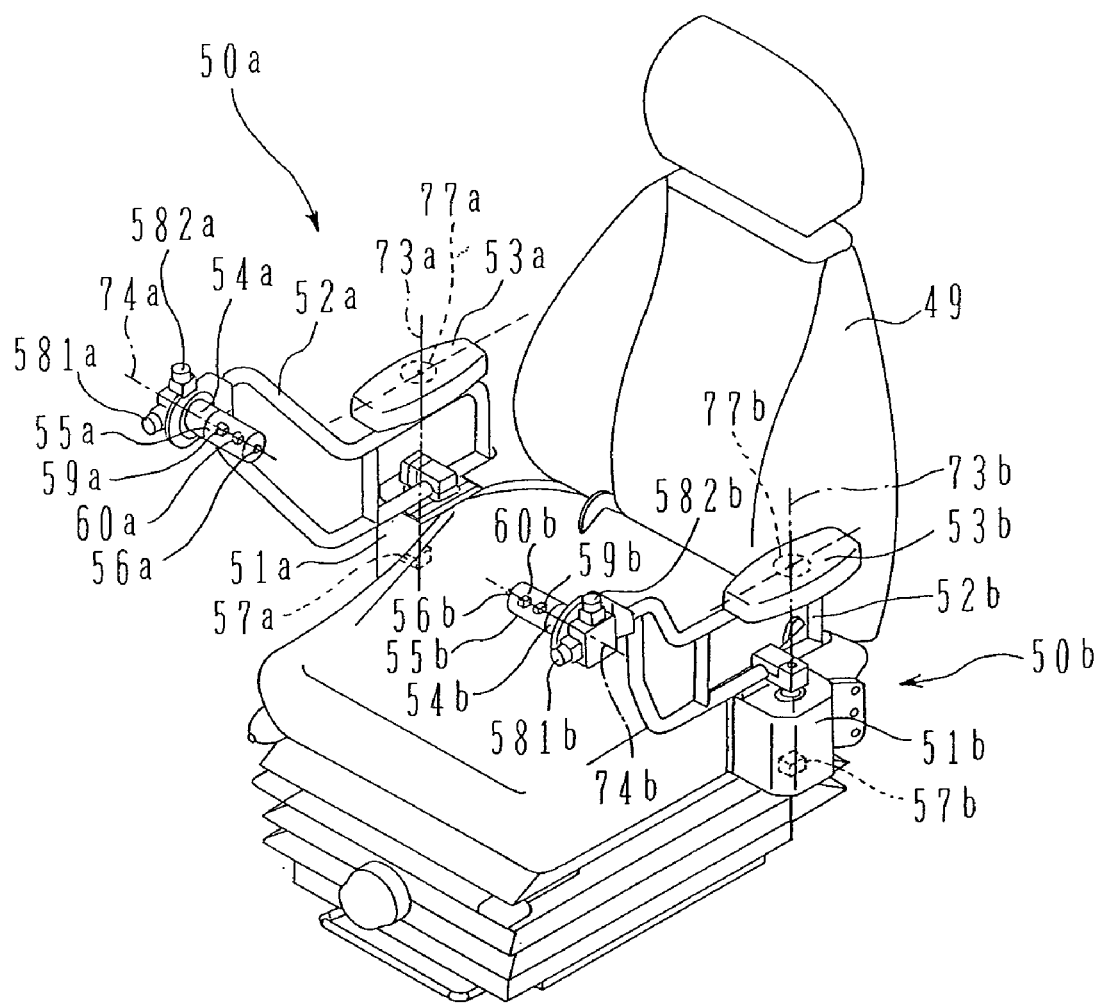
FIG. 3 is a perspective view that shows operating devices provided in the double-arm working machine according to the first embodiment of the present invention.
Figure 4:
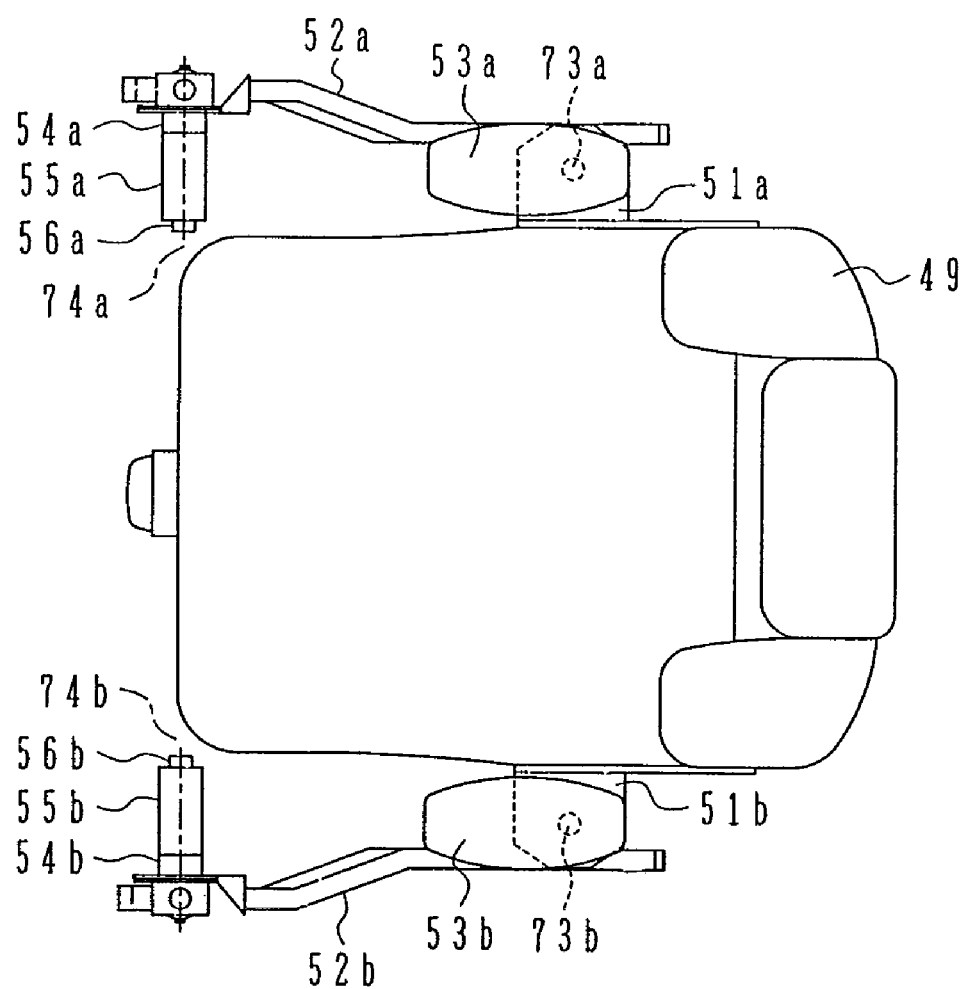
FIG. 4 is a plan view showing the operating devices provided in the double-arm working machine according to the first embodiment of the present invention.

FIG. 3 is a perspective view that shows operating devices provided in the present embodiment. FIG. 4 is a plan view of the operating devices.

As shown in FIGS. 3 and 4, the cabin 4 internally has an operator's seat 49 and operating devices 50a, 50b on the left and right sides of the operator's seat 49. The operating device 50a is for operating the first work front A, and the operating device 50b is for operating the second work front B.

The operating device 50a includes: a control arm bracket 51a provided on the right side of the operator's seat 49; a control arm 52a installed on the control arm bracket 51a so as to be laterally swayable about a swaying central axis 73a, the control arm 52a being provided to specify lateral swaying of the swing post 7a; a control lever 54a installed horizontally on a distal end portion of the control arm 52a so as to be pivotable vertically and longitudinally, the control lever 54a being provided to specify operation of the boom 10a and the arm 12a; an attachment-turning lever 55a installed on a peripheral section of the control lever 54a so as to be pivotable about an axial center of the control lever 54a, the attachment-turning lever 55a being provided to specify pivotal movement of the grapple 20a; and an attachment control switch 56a installed at the distal end of the control lever 54a in order to specify a start/stop of the grapple 20a.

The operating device 50a also includes: a control arm position change sensor 57a provided in the control arm bracket 51a in order to sense a variation in a swaying position of the control arm 52a and generate a signal; a control lever vertical position change sensor 581a provided on the control arm 52a in order to sense a variation in a vertical operating position of the control lever 54a and generate a signal; a control lever longitudinal position change sensor 582a provided on the control arm 52a in order to sense a variation in a longitudinal operating position of the control lever 54a and generate a signal; a turning lever position change sensor 59a provided in the control lever 54a in order to sense a variation in a rotating position of the attachment-turning lever 55a and generate a signal; and a control switch position change sensor 60a provided in the attachment-turning lever 55a in order to sense a variation in a position of the attachment control switch 56a and generate a signal.

The operating device 50b provided at the left side of the operator's seat is essentially the same as the operating device 50a in configuration, and is constructed to be almost left/right symmetric with respect to the operating device 50a. Members of the operating device 50b that function the same as those of the operating device 50a are each denoted with a suffix "b", instead of "a" in the reference numbers and symbols assigned to the operating device 50a, and description of such members is omitted herein.

<Control System Configuration>

Figure 5:
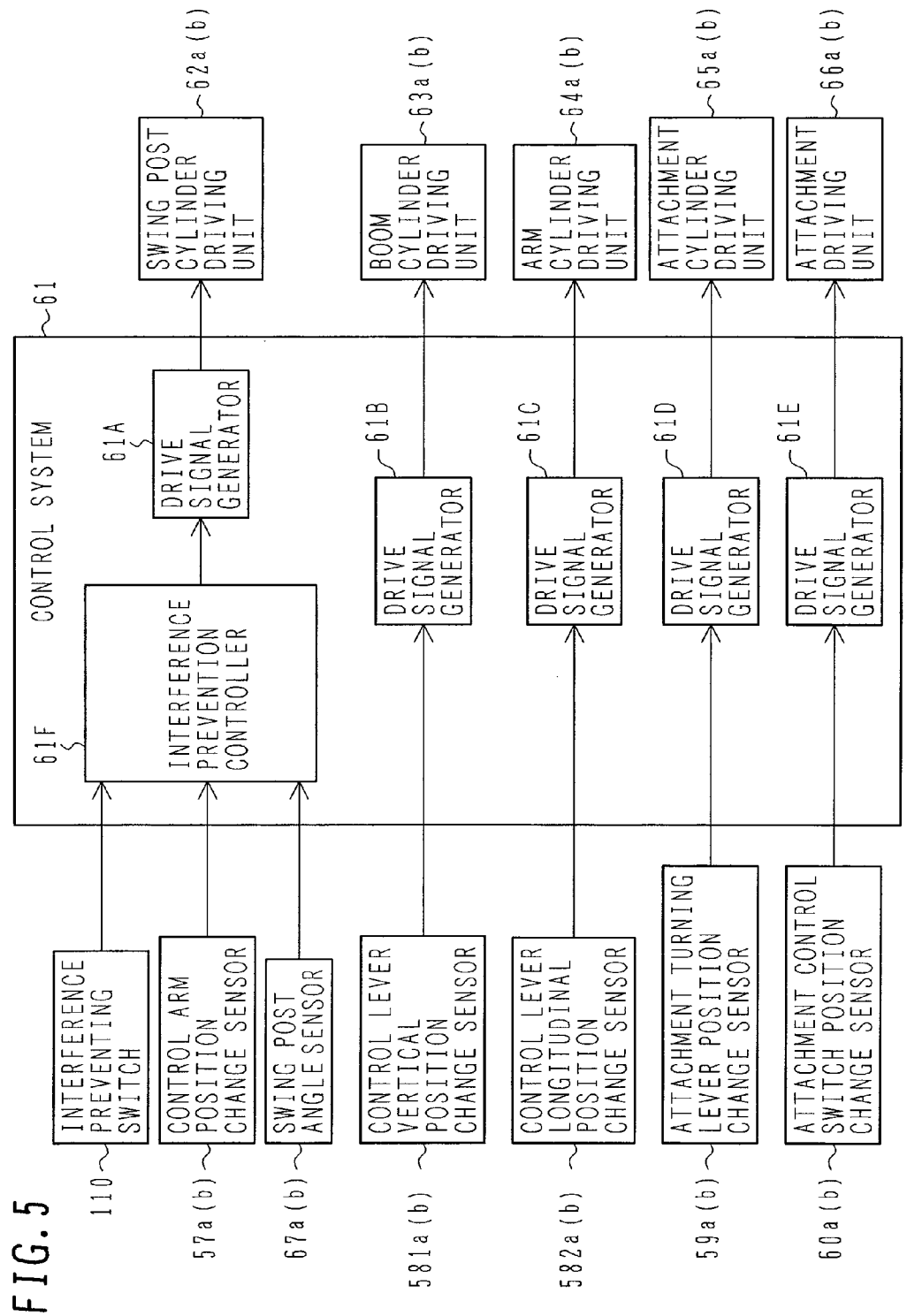
FIG. 5 is a functional block diagram of control units for a work front provided in the double-arm working machine according to the first embodiment of the present invention.

FIG. 5 is a functional block diagram of control units for the work front A, B. Reference symbols enclosed in parentheses in FIG. 5 denote the associated constituent elements of the second work front B or of its operating device 50b.

The control units shown in FIG. 5 can be broadly classified into: input units composed of the above operating device's position change sensors, the work front's angle sensors (described later herein), and other elements; a control system 61 which, after receiving an input signal from the input units and then conducting required computations, generates and outputs a driving signal; and output units composed of driving units (described later) which, after receiving an output signal from the input units, operate an associated driving unit of the work front.

In addition to the above position change sensors 57a, 57b, 581a, 581b, 582a, 582b, 59a, 59b, 60a, 60b, the swing post angle sensors 67a, 67b mounted near the swaying axial centers (vertical axes) of the swing posts 7a, 7b, and other sensors, the input units of the control system 61 include an interference preventing switch 110 provided at an appropriate position inside the cabin 4 in order to select whether interference prevention is to be made operative or inoperative.

The output units of the control system 61 also include: a swing post driving unit 62a, 62b that drives a swing post cylinder 9a, 9b adapted to sway the swing post 7a, 7b laterally; a boom cylinder driving unit 63a, 63b that drives a boom cylinder 11a, 11b adapted to sway the boom 10a, 10b vertically; an arm cylinder driving unit 64a, 64b that drives an arm cylinder 13a, 13b adapted to sway the arm 12a, 12b vertically; an attachment cylinder driving unit 65a, 65b that drives an attachment cylinder 15a, 15b adapted to pivotally move the grapple 20a, 20b; and an attachment driving unit 66a, 66b that activates a drive (not shown) that is adapted for gripping with the grapple 20a, 20b.

The control system 61 has: an interference prevention controller 61F which, on the basis of signals from the control arm position change sensor 57a, 57b and from the swing post angle sensor 67a, 67b, conducts interference prevention control according to a particular difference in angle between the left swing post 7a and the right swing post 7b; a driving signal generator 61A which, on the basis of an output signal from the interference prevention controller 61F, generates a driving signal to be addressed to the swing post cylinder driving unit 62a, 62b; a driving signal generator 61B which, on the basis of a signal from the control lever vertical position change sensor 581a, 581b, generates a driving signal to be addressed to the boom cylinder driving unit 63a, 63b; a driving signal generator 61C which, on the basis of a signal from the control lever lateral position change sensor 582a, 582b, generates a driving signal to be addressed to the arm cylinder driving unit 64a, 64b; a driving signal generator 61D which, on the basis of a signal from the attachment-turning lever position change sensors 59a, 59b, generates a driving signal to be addressed to the attachment cylinder driving unit 65a, 65b; and a driving signal generator 61E which, on the basis of a signal from the attachment control switch position change sensors 60a, 60b, generates a driving signal to be addressed to the attachment driving unit 66a, 66b.

Next, operation of the first work front A and the second work front B is described below using FIGS. 6 and 7.

Figure 6:
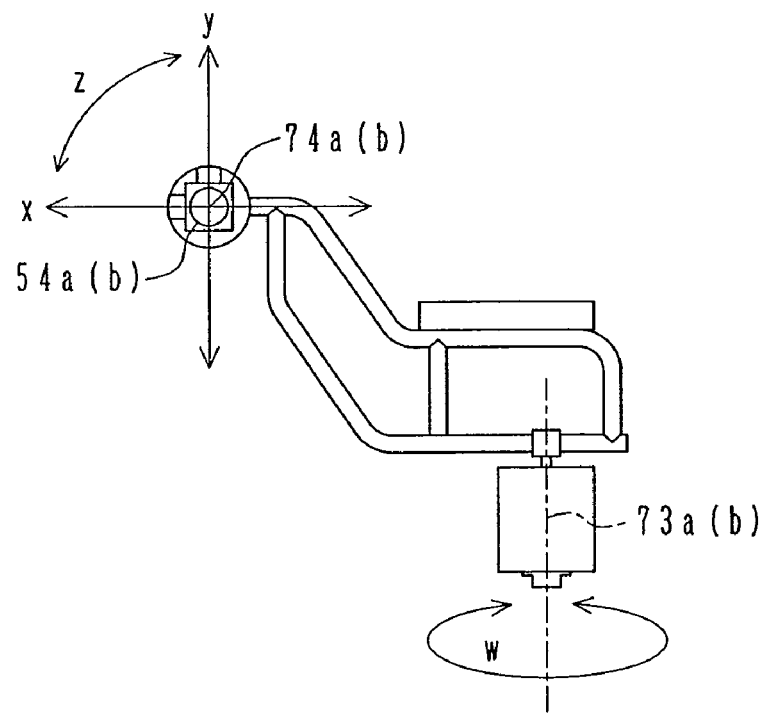
FIG. 6 is a diagram that shows operating directions of an operating device provided in the double-arm working machine according to the first embodiment of the present invention.
Figure 7:
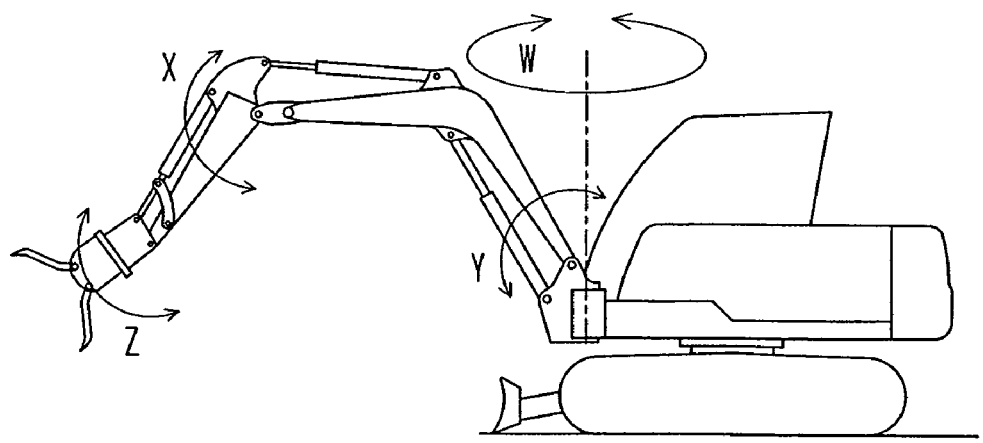
FIG. 7 is a diagram that shows the work front operating directions that are associated with the operating directions of the above operating device.

FIG. 6 is a diagram that shows operating directions of an operating device. FIG. 7 is a diagram that shows the operating directions of the work front that are associated with the operating directions of the operating device. Operating directions of the second work front B are shown in parentheses in each figure, and description of these operating directions is omitted herein.

<Operating Posture>

When an operator actuates the first work front A and the second work front B by operating the operating devices 50a, 50b, respectively, the operator sits on the operator's seat 49, rests the elbow of the right arm on an elbow support 77a of an arm rest 53a located on the control arm 52a, grips the attachment-turning lever 55a, and puts the thumb onto the attachment control switch 56a. The operator also rests the elbow of the left arm on an elbow support 77b of an arm rest 53b located on the control arm 52b, grips the attachment-turning lever 55b, and puts, for example, the thumb onto the attachment control switch 56b.

<Operation Based on Control Lever Operations>

After taking the above operating posture, when the operator changes a position of the control lever 54a, 54b in a vertical direction (see "y", FIG. 6) by operating the gripped attachment-turning lever 55a, 55b vertically, the control lever vertical position change sensor 581a, 581b will transmit an appropriate sensor signal to the driving signal generator 61B within the control system 61. Next, the driving signal generator 61B that has received the sensor signal will transmit a driving signal to the boom cylinder driving unit 63a, 63b. Furthermore, the boom cylinder driving unit 63a, 63b that has received the driving signal will change length of the boom cylinder 11a, 11b. The boom 10a, 10b will then sway (turn vertically as denoted by Y in FIG. 7) in the same direction as a turning direction of the control lever 54a, 54b.

At this time, a swaying speed of the boom 10a, 10b will be held in a relationship of monotonic increase (e.g., a proportional relationship) with respect to a variation in a position of the control lever 54a, 54b, and the swaying speed of the boom 10a, 10b will be controlled according to the particular change in the position of the control lever 54a, 54b.

Similarly, changing the position of the control lever 54a, 54b longitudinally (see "x", FIG. 6) by operating the gripped attachment-turning lever 55a, 55b longitudinally causes the control lever lateral position change sensor 582a, 582b to transmit a sensor signal to the driving signal generator 61C within the control system 61. Next, the driving signal generator 61C that has received the sensor signal transmits a driving signal to the arm cylinder driving unit 64a, 64b. Furthermore, the arm cylinder driving unit 64a, 64b that has received the driving signal changes length of the arm cylinder 13a, 13b. The arm 12a, 12b then sways (turns longitudinally as denoted by X in FIG. 7) in the same direction as the turning direction of the control lever 54a, 54b.

At this time, a swaying speed of the arm 12a, 12b is held in a relationship of monotonic increase (e.g., a proportional relationship) with respect to a variation in a position of the control lever 54a, 54b, and the swaying speed of the arm 12a, 12b will be controlled according to the particular change in the position of the control lever 54a, 54b.

<Operation Based on Turning Lever Operations>

Turning the attachment-turning lever 55a, 55b about a turning central axis 74a, 74b thereof causes the attachment-turning lever position change sensor 59a, 59b to transmit an appropriate sensor signal to the driving signal generator 61D within the control system 61. Next, the driving signal generator 61D that has received the sensor signal transmits a driving signal to the attachment cylinder driving unit 65a, 65b. Furthermore, the attachment cylinder driving unit 65a, 65b that has received the driving signal changes length of the attachment cylinder 15a, 15b. The grapple 20a, 20b then turns (as denoted by Z in FIG. 7) in the same direction as the turning direction of the attachment-turning lever 55a, 55b.

A turning speed of the grapple 20a, 20b at this time is held in a relationship of monotonic increase (e.g., a proportional relationship) with respect to a variation in a position of the attachment-turning lever 55a, 55b, and the turning speed of the grapple 20a, 20b will be controlled according to the particular change in the position of the attachment-turning lever 55a, 55b.

<Operation Based on Control Switch Operations>

Operating the attachment control switch 56a, 56b causes the attachment control switch position change sensor 60a, 60b to transmit an appropriate sensor signal to the driving signal generator 61E within the control system 61. Next, the driving signal generator 61E that has received the sensor signal transmits a driving signal to the attachment driving unit 66a, 66b. Furthermore, the attachment driving unit 66a, 66b that has received the driving signal drives claws of the grapple 20a, 20b to open or close the claws.

An opening or closing speed of the grapple 20a, 20b at this time is held in a relationship of monotonic increase (e.g., a proportional relationship) with respect to a variation in a position of the attachment control switch 56a, 56b, and a driving speed of the attachment will be controlled according to the particular change in the position of the attachment control switch 56a, 56b.

As described above, the grapple 20a, 20b can be replaced with other attachments. When a self-actuated attachment is mounted, however, operation of the mounted attachment is specified from the attachment control switch 56a, 56b. For example, when a breaker is used as the attachment, operation of the breaker is turned on/off by operating the attachment control switch 56a, 56b.

<Operation Based on Control Arm Operations>

For example, when the operator uses the antebrachial region to sway the control arm 52a, 52b of the operating device 50a, 50b laterally (see "w", FIG. 6), the control arm position change sensor 57a, 57b and the swing post angle sensor 67a, 67b will transmit an appropriate sensor signal to the interference prevention controller 61F (described later) within the control system 61. If an input signal from the interference preventing switch 110 is on, the interference prevention controller 61F that has received the sensor signal will compute a command signal that incorporates prevention of interference between the work fronts A, B and transmit this signal to the driving signal generator 61A. The driving signal generator 61A will transmit a driving signal to the swing post cylinder driving unit 62a, 62b. Furthermore, the swing post cylinder driving unit 62a, 62b that has received the driving signal will change length of the swing post cylinder 9a, 9b. The swing post 7a, 7b will then be swayed (see W, FIG. 7) in the same direction as that in which the control arm 52a, 52b changes in position.

At this time, a swaying speed of the swing post 7a, 7b will be held in a relationship of monotonic increase (e.g., a proportional relationship) with respect to a variation in a position of the control arm 52a, 52b, and the swaying speed of the swing post 7a, 7b will be controlled according to the particular change in the position of the control arm 52a, 52b.

<Operational Control by the Interference Prevention Controller>

Computation by the interference prevention controller 61F located within the control system 61 is described in detail below.

First, as shown in FIG. 2, an angle of the right swing post 7a is taken as $\theta a$ ($>0$), and an angle of the left swing post 7b, as $\theta b$ ($>0$). Also, a differential between the above two angles is taken as $\theta c$ ($\theta b$-$\theta a$). Under these conditions, the angles $\theta a$, $\theta b$ can be defined in the same manner for the left swing post 7a and the right swing post 7b. In the present embodiment, however, angles formed by centerlines 17a, 17b of the respective work fronts A, B with respect to reference lines 16a, 16b each extending from a turning center of the associated swing post 7a, 7b, towards the right side thereof, are defined as the angles $\theta a$, $\theta b$. The reference lines 16a, 16b are parallel to each other.

Figure 8:
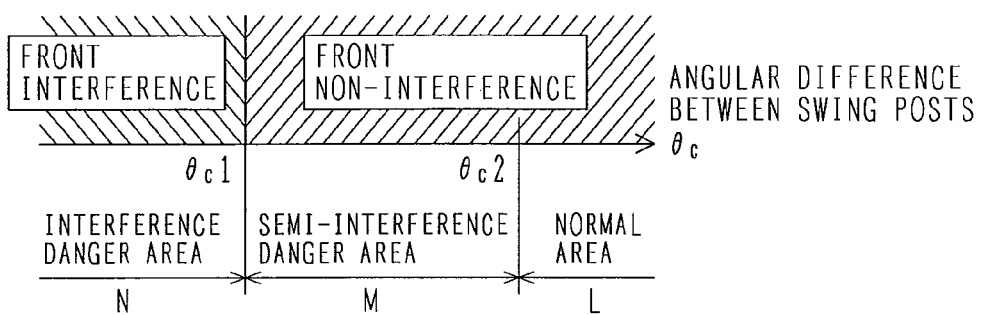
FIG. 8 is a conceptual diagram that shows a relationship between a work front differential angle and interference/non-interference in the double-arm working machine according to the first embodiment of the present invention.

FIG. 8 is a conceptual diagram that represents a relationship between work front differential angle $\theta c$ and interference/non-interference.

Between the work fronts A and B in FIG. 8, there is the relationship that contact between both work fronts occurs when the differential angle $\theta c$ decreases below a threshold value $\theta c1$ smaller than zero (0). A method of determining the threshold value $\theta c1$ is not limited. However, if the assigned threshold value is, for example, the largest usable safety value, when the work fronts A and B are both extended to their maximum horizontal operating length for a maximum swinging radius, a differential angle at which the work fronts A, B are liable to come into contact on an extension of the centerline 3c of the upper swing structure 3, or an angle greater than this differential angle may be determined as the threshold value $\theta c1$. The threshold value $\theta c1$ thus determined is previously stored within the interference prevention controller 61F, and the area of $\theta c \leq \theta c1$ that is a differential angle range in which the work fronts A, B are liable to come into contact is defined as an interference danger area N.

However, partly since an area of $\theta > \theta c1$ is an area in which, even when the work fronts A, B are present in an area that does not permit the work fronts A, B to interfere for their structural reasons while in a stopped state, the work fronts A, B are difficult to stop abruptly, if the work fronts, even during operation in a non-interference area, are operated to make relative approaches near the interference danger area, both work fronts are liable to enter the interference danger area and interfere, depending on operating speed. Accordingly, a threshold value $\theta c2$ ($>\theta c1$) that has been assigned with the possible interference taken into account is previously stored within the interference prevention controller 61F, and the area of $\theta c1 < \theta c \leq \theta c2$ that is the assigned differential angle range contiguous to the interference danger area is defined as a semi-interference danger area.

An area of θc>θc2 is defined as a normal area in which the interference between the work fronts A, B is unlikely, regardless of their operating states.

Figure 9:
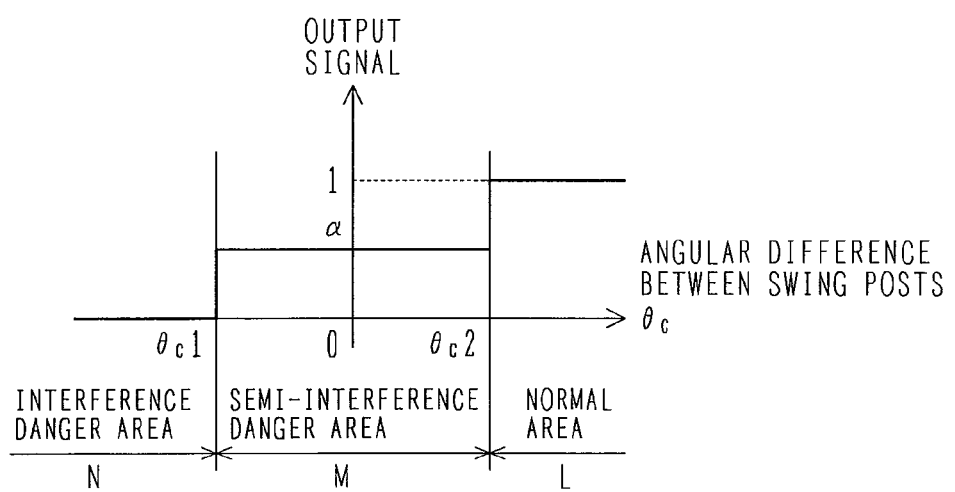
FIG. 9 is a diagram showing an example of a relationship between an interference prevention controller output signal level and left/right work front differential angle obtained during work front swinging for relative approaching in the double-arm working machine according to the first embodiment of the present invention.

FIG. 9 is a diagram showing an example of a relationship between an interference prevention controller output signal level and left/right work front differential angle obtained during work front swinging for relative approaching.

In FIG. 9, a horizontal axis denotes the differential angle θc and a vertical axis denotes the output signal. This output signal is already made dimensionless through division by an input signal. In the example of FIG. 9, when the differential angle θc between the work fronts A, B exists in the normal area L, the output signal value becomes 1 and an original output signal value that has been calculated from the input signal is output intact. When the differential angle θc between the work fronts A, B exists in the semi-interference danger area M, the output signal value becomes α (0<α<1) and the original output signal value that has been calculated from the input signal is subtracted through a multiplication by a certain α value before being output. When the differential angle θc between the work fronts A, B exists in the interference danger area N, the output signal value becomes 0 and the output signal specifying a swinging stop for the work fronts A, B is output.

Next, output signal computing sequences of the interference prevention controller 61F for each area are described below.

i) Normal Area L

When the differential angle θc between the left swing post 7a and the right swing post 7b exists in the normal area L, that is, exists outside the semi-interference danger area M, the interference prevention controller 61F directly transmits the output signal to the driving signal generator 61A without subtracting the output signal value that has been computed using the input signal received from the control arm position change sensor 57a, 57b.

ii) Semi-Interference Danger Area M

When the differential angle θc between the left swing post 7a and the right swing post 7b exists in the semi-interference danger area M and the input signal from the control arm position change sensor 57a, 57b is a signal that makes the work fronts A, B leave the semi-interference danger area M and approach the interference danger area N, that is, a signal that commands the work fronts A, B to approach each other, the interference prevention controller 61F subtracts the output signal value that has been computed using the input signal received from the control arm position change sensor 57a, 57b, and then transmits the output signal to the driving signal generator 61A.

Conversely, even if the differential angle θc between the left swing post 7a and the right swing post 7b exists in the semi-interference danger area M, when the input signal from the control arm position change sensor 57a, 57b is the signal that makes the work fronts A, B leave the semi-interference danger area M and approach the normal area L, that is, the signal that commands the work fronts A, B to move away from each other, the interference prevention controller 61F directly transmits the output signal to the driving signal generator 61A without subtracting the output signal value that has been computed using the input signal received from the control arm position change sensor 57a, 57b.

iii) Interference Danger Area N

When the differential angle θc between both swing posts 7a, 7b already exists in the interference danger area N and the input signal from the control arm position change sensor 57a, 57b is a signal that moves the work fronts A, B further away from the semi-interference danger area M, that is, a signal that commands the work fronts A, B to move closer to each other, the interference prevention controller 61F generates the output signal for stopping the swing operation of the work fronts A, B, and transmits the output signal to the driving signal generator 61A.

However, even if the differential angle θc between both swing posts 7a, 7b exists in the interference danger area N, when the input signal from the control arm position change sensor 57a, 57b is the signal that makes the work fronts A, B approach the semi-interference danger area M, that is, a signal that commands the work fronts A, B to move away from each other, the interference prevention controller 61F directly transmits the output signal to the driving signal generator 61A without subtracting the output signal value that has been computed using the input signal received from the control arm position change sensor 57a, 57b.

<Interference Prevention Control On/Off>

The above-described interference prevention control by the interference prevention controller 61F is turned on/off by the input signal from the interference preventing switch 110. That is to say, when the input signal from the interference preventing switch 110 is on, the interference prevention controller 61F makes the interference prevention control effective, and as described above, changes a gain of the output signal to the driving signal generator 61A according to area. Conversely, when the input signal from the interference preventing switch 110 is off, the interference prevention controller 61F makes the interference prevention control ineffective, and directly transmits the output signal to the driving signal generator 61A without subtracting the output signal value that has been computed using the input signal. That is to say, the output signal in FIG. 9 is set to take a value of 1 at all times for each area.

<Operational Effects>

For the double-arm working machine that operates as described above, since the machine has the left work front A and the right work front B, it is possible, for example, during an automobile dismantling operation, to fix a bodywork of the automobile by operating the first work front A, and remove parts of the automobile by operating the second work front B. In addition, during destruction of a structure using an attachment such as a breaker, crusher, or reinforcing-bar cutter, the structure can be destroyed with one work front while gripping the structure with the other work front. Furthermore, when the object dismantled has a section to be protected, this section can be supported using the work fronts A, B to prevent falling or dropping, without lifting the section by means of a crane or the like, and the dismantling operation can be performed efficiently with a minimum manpower requirement.

Furthermore, according to the present embodiment, providing the semi-interference danger area M and assigning the work fronts A, B such a positional relationship that causes the work fronts to approach each other in the semi-interference danger area M makes it possible to reduce a relative operating speed of the work fronts A, B before the work fronts A, B move into the interference danger area N the and hence to prevent the work fronts from being damaged or destroyed by interference.

The above does not describe which of the work fronts A, B has its swinging speed reduced during the interference prevention control, but for example, if both work fronts A, B are operated to swing, when both approach each other, the swinging speeds of both may be reduced, or if both are operated to swing in the same direction and both approach each other according to a particular difference in swinging speed, the swinging speeds of both may be reduced or the speed of one work front swinging towards the other work front may be reduced. Needless to say, if one work front does not swing and only the other work front swings and approaches the other work front, this latter work front is reduced in swinging speed.

In addition, a signal level of the output signal which the interference prevention controller 61F transmits when the relationship in position between the work fronts A, B exists in the semi-interference danger area is not limited to/by the aspect shown in FIG. 9 (i.e., reduction ratio "α" is fixed), and this reduction ratio may be lowered stepwise or any one of the aspects described as examples below may be employed.

<First Modification>

Figure 10:
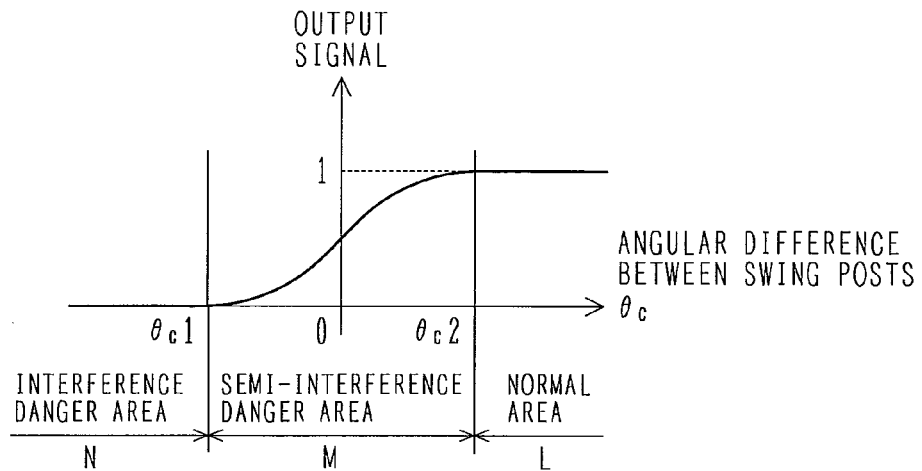
FIG. 10 is a diagram showing another example of a relationship between the interference prevention controller output signal level and left/right work front differential angle obtained during work front swinging for relative approaching in the double-arm working machine according to the first embodiment of the present invention.

FIG. 10 is a diagram showing another example of a relationship between the interference prevention controller output signal level and left/right work front differential angle obtained during work front swinging for relative approaching. The horizontal and vertical axes shown in FIG. 10 denote the same as in FIG. 9.

In the example of FIG. 10, the output signal in the semi-interference danger area M is set to continuously decrease from 1 to 0 (zero) as the signal approaches the interference danger area N, and particularly in the present example, the above relationship is defined by a nonlinear curve free of a discontinuous point. In the present example, as the relationship in position between the work fronts A, B approaches the interference danger area N, the relative speed at which one work front approaches the other work front will be suppressed, so the swing post cylinder 9a, 9b can be stopped more gently than in the example of FIG. 9. In addition, if, as in the present example, the relationship between the differential angle θc and the output signal is defined using a nonlinear curve free of a discontinuous point, to stop the swing operation of the work fronts A, B more smoothly and more gently.

<Second Modification>

Figure 11:
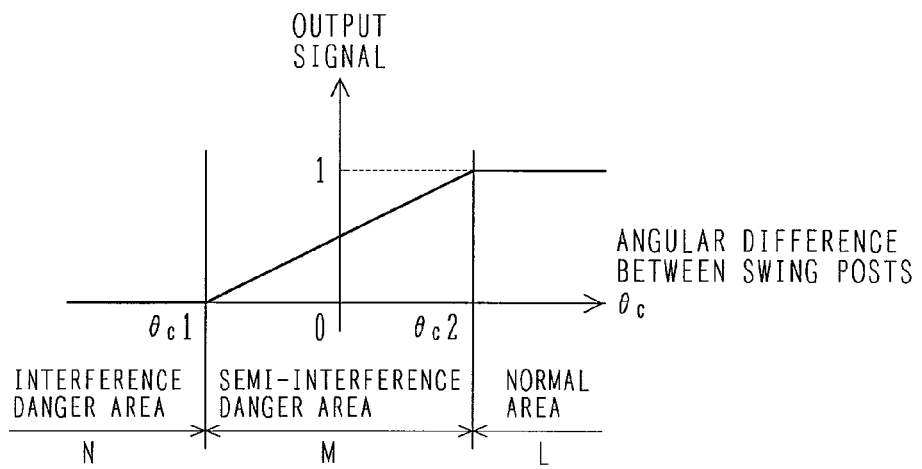
FIG. 11 is a diagram showing yet another example of a relationship between the interference prevention controller output signal level and left/right work front differential angle obtained during work front swinging for relative approaching in the double-arm working machine according to the first embodiment of the present invention.

FIG. 11 is a diagram showing yet another example of a relationship between the interference prevention controller output signal level and left/right work front differential angle obtained during work front swinging for relative approaching. The horizontal and vertical axes shown in FIG. 11 denote the same as in FIG. 9.

In the example of FIG. 11, the output signal in the semi-interference danger area M is also set to continuously decrease from 1 to 0 (zero) as the signal approaches the interference danger area N. In the present example, the above relationship is defined by a linear curve having a definite gradient, and a connection point with respect to the output signal in the normal area L/interference danger area N is discontinuous. In the working machine of such construction, as the relationship in position between the work fronts A, B approaches the interference danger area N, the relative speed at which one work front approaches the other work front will also be suppressed, so the swing post cylinder 9a, 9b can be stopped more gently than in the example of FIG. 9.

<Third Modification>

Figure 12:
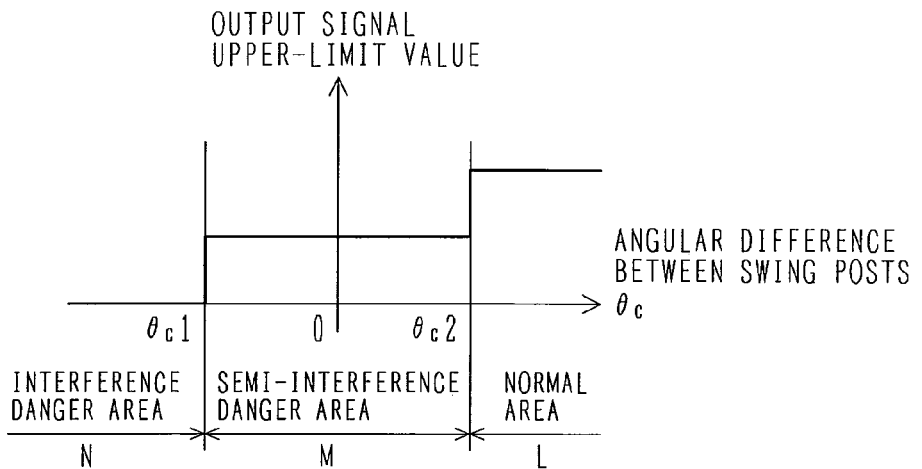
FIG. 12 is a diagram showing a further example of a relationship between the interference prevention controller output signal level and left/right work front differential angle obtained during work front swinging for relative approaching in the double-arm working machine according to the first embodiment of the present invention.
Figure 13:
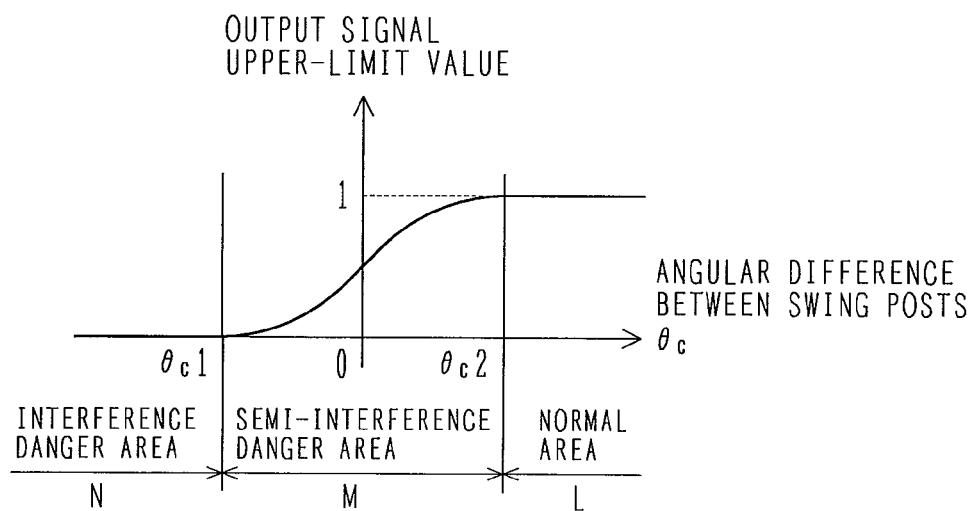
FIG. 13 is a diagram showing a further example of a relationship between the interference prevention controller output signal level and left/right work front differential angle obtained during work front swinging for relative approaching in the double-arm working machine according to the first embodiment of the present invention.
Figure 14:
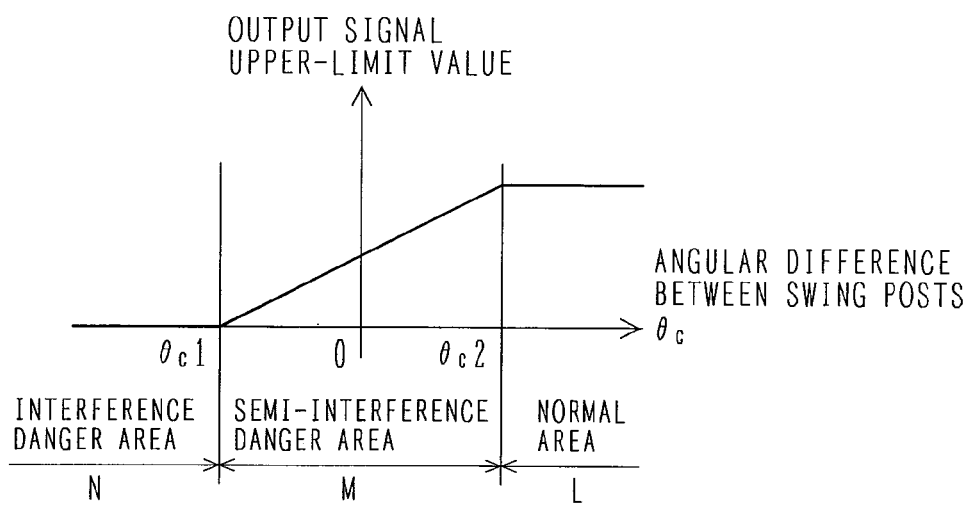
FIG. 14 is a diagram showing a further example of a relationship between the interference prevention controller output signal level and left/right work front differential angle obtained during work front swinging for relative approaching in the double-arm working machine according to the first embodiment of the present invention.

FIGS. 12 to 14 are diagrams that show further examples of a relationship between the interference prevention controller output signal level and left/right work front differential angle obtained during work front swinging for relative approaching. In each of these figures, a horizontal axis denotes the differential angle θc, as in FIG. 9, and a vertical axis denotes an upper-limit value of the output signal.

In the examples of FIGS. 9-11, the output signal that has been calculated according to the particular input signal level in the semi-interference danger area M is multiplied by a coefficient to reduce the swinging speed, whereas, in the examples of FIGS. 12-14, an upper-limit value of the swinging speed is set to be as shown in either figure, and the swinging speed of the work front A, B in the semi-interference danger area M is limited and reduced. How great the manipulated variable is, the output signal is controlled to stay within the upper limit. Essentially the same advantageous effects as obtained in the examples of FIGS. 9-11 can be obtained by using the above method.

Second Embodiment

A second embodiment of the present invention is described below.

In the first embodiment, the interference danger area N and the semi-interference danger area M have been defined for the swinging differential angle θc and the swing operation of the work front A, B has been controlled on the basis only of the differential angle θc. In the second embodiment, the interference danger area N, the semi-interference danger area M, and the normal area L are defined considering a posture (e.g., a vertical position) of the work front A, B in addition to the differential angle θc, and operation associated with vertical swaying of the work fronts A, B, as well as the swing operation thereof, is appropriately controlled to prevent interference between both work fronts. The operation associated with vertical swaying of the work fronts A, B refers to the sway operation of the booms 10a, 10b, arms 12a, 12b, and grapples 20a, 20b. Postures of the booms 10a, 10b, arms 12a, 12b, and grapples 20a, 20b are calculated from turning angles of the booms 10a, 10b with respect to the swing posts 7a, 7b, turning angles of the arms 12a, 12b with respect to the booms 10a, 10b, and turning angles of the grapples 20a, 20b with respect to the arms 12a, 21b.

<Description of the Control System>

Figure 15:
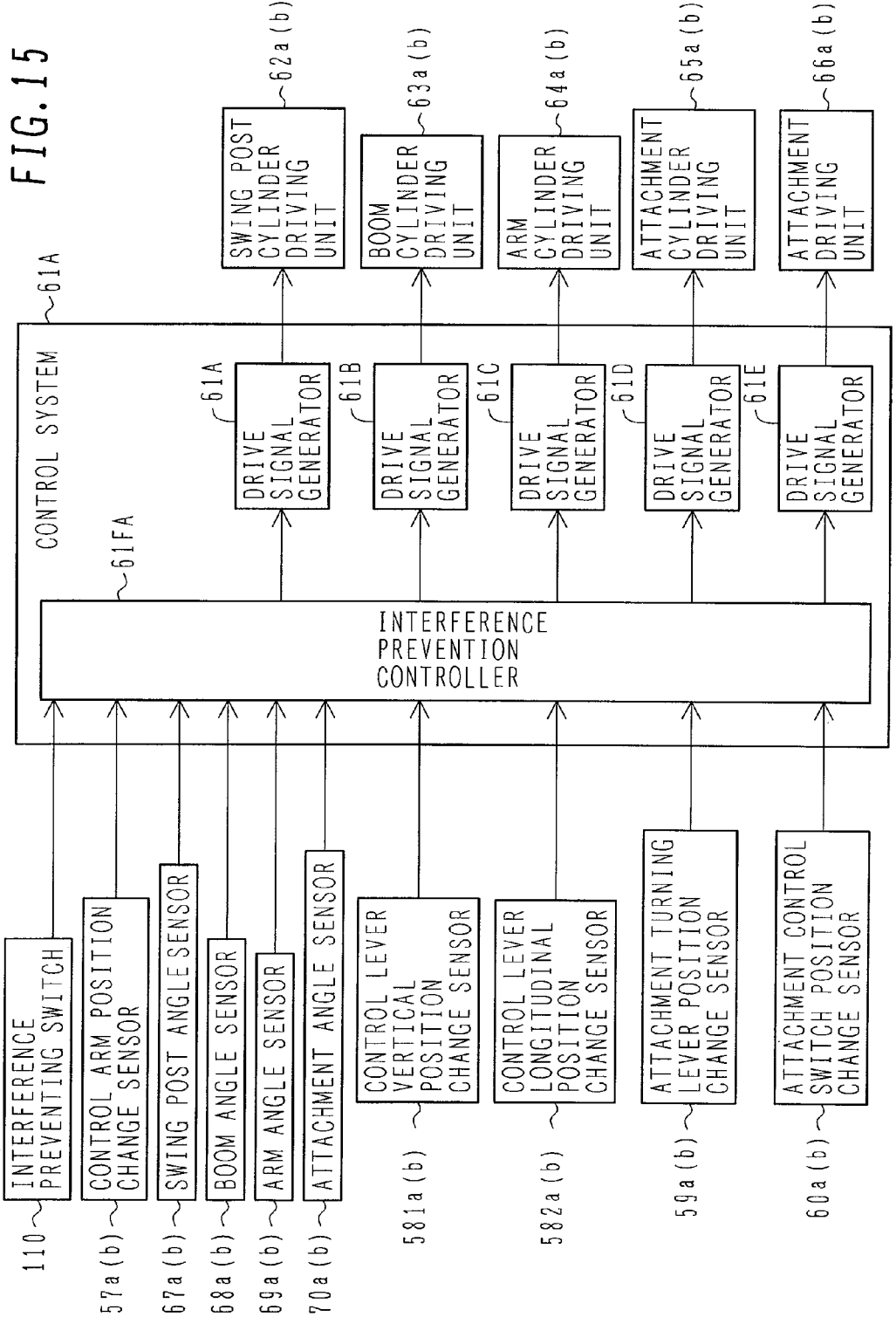
FIG. 15 is a functional block diagram of a control system for a work front provided in a double-arm working machine according to a second embodiment of the present invention.

FIG. 15 is a functional block diagram of the control system for the work front A, B in the double-arm working machine according to the second embodiment.

As shown in FIG. 15, in addition to the sensors 57a, 57b, 67a, 67b, 581a, 1581b, 582a, 582b, 59a, 59b, 60a, 60b and interference preventing switch 110 shown in FIG. 5, input units of the control system 61A in the present embodiment include: boom angle sensors 68a, 68b that sense the turning angles of the booms 10a, 10b with respect to the swing posts 7a, 7b, arm angle sensors 69a, 69b that sense the turning angles of the arms 12a, 12b with respect to the booms 10a, 10b, and attachment angle sensors 70a, 70b that sense the turning angles of the grapples 20a, 20b with respect to the arms 12a, 12b.

Signals from the position change sensors 57a, 57b, 581a, 581b, 582a, 582b, 59a, 59b of the operating devices 50a, 50b, signals from the angle sensors 67a, 67b, 68a, 68b, 69a, 69b, 70a, 70b of the work fronts A, B, and signals from the interference preventing switch 110 are input to an interference prevention controller 61FA provided within the control system 61A. In accordance with these signals, the interference prevention controller 61FA computes the relationship in position between the work fronts A, B (i.e., the differential angle θc and the postures), and prevents interference between the work fronts A, B by considering the swinging angles and postures thereof (the prevention of the interference will be described in detail later herein). Output signals to the driving signal generators 61A to 61E are computed from respective input signals by the interference prevention controller 61FA, and output to the associated driving signal generators.

<Interference Prevention Control>

Sequences that the interference prevention controller 61FA uses to compute the signals to be output to each driving signal generator during interference prevention control are described below.

First, an interference prevention control sequence is outlined below.

Step 1: A plurality of interference prevention reference points to become a basis for interference prevention control are set for each of the two work fronts.

Step 2: Positional coordinates of each interference prevention reference point are calculated by linkage operations.

Step 3: Of all interference prevention reference points on the work fronts, only two points forming the shortest distance are extracted and the distance between the two points is calculated as the shortest distance therebetween.

Step 4: Areas are discriminated from the shortest distance between the two reference points.

Step 5: An output signal that allows for the prevention of interference is created from area discrimination results and an operating signal, and the signal is output to the appropriate driving signal generator.

Next, details of processing in each step are described below.

<Step 1: Setting the Interference Prevention Reference Points>

Figure 16:
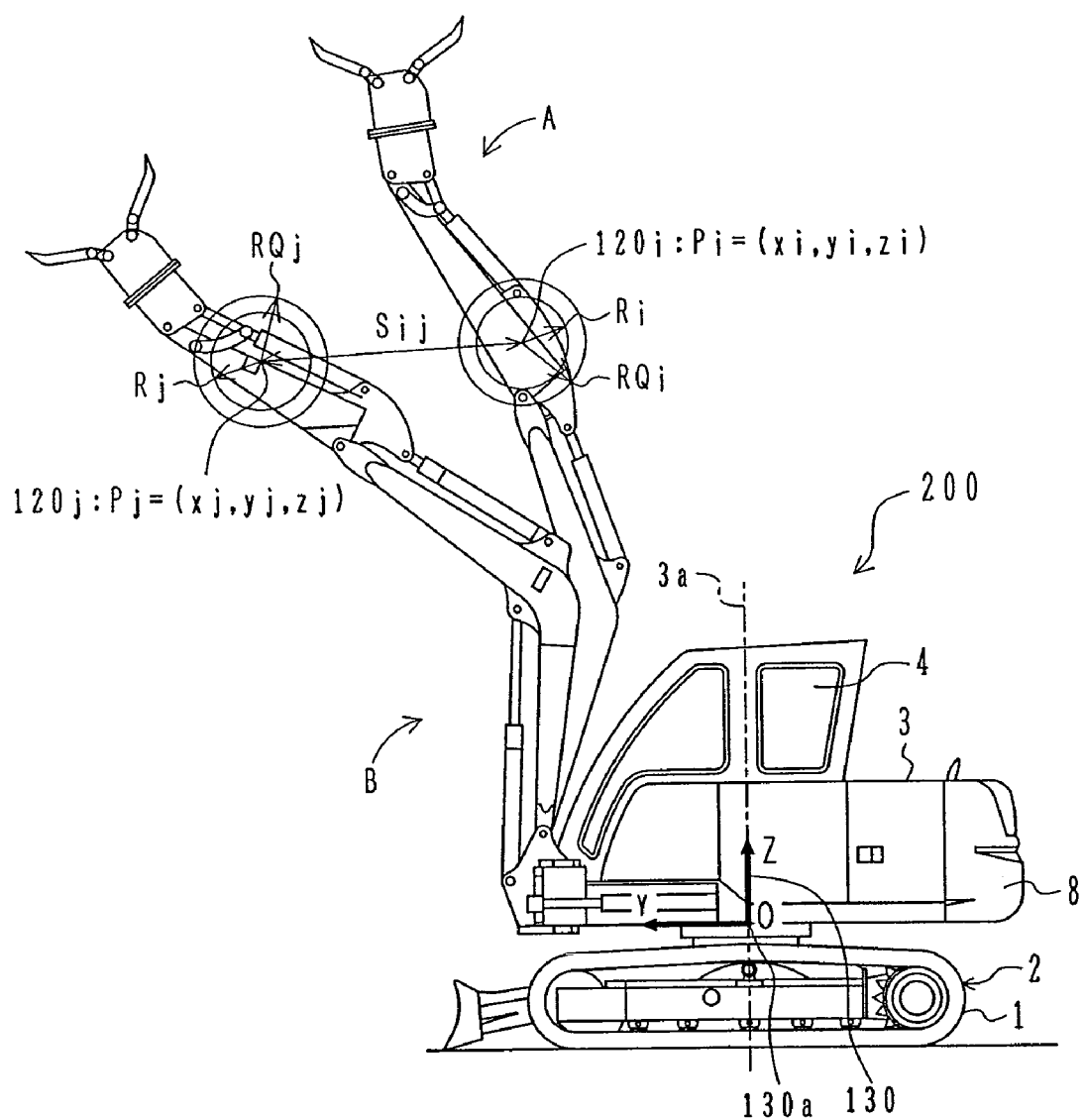
FIG. 16 is a side view that shows appearance of the double-arm working machine according to the second embodiment of the present invention.
Figure 17:
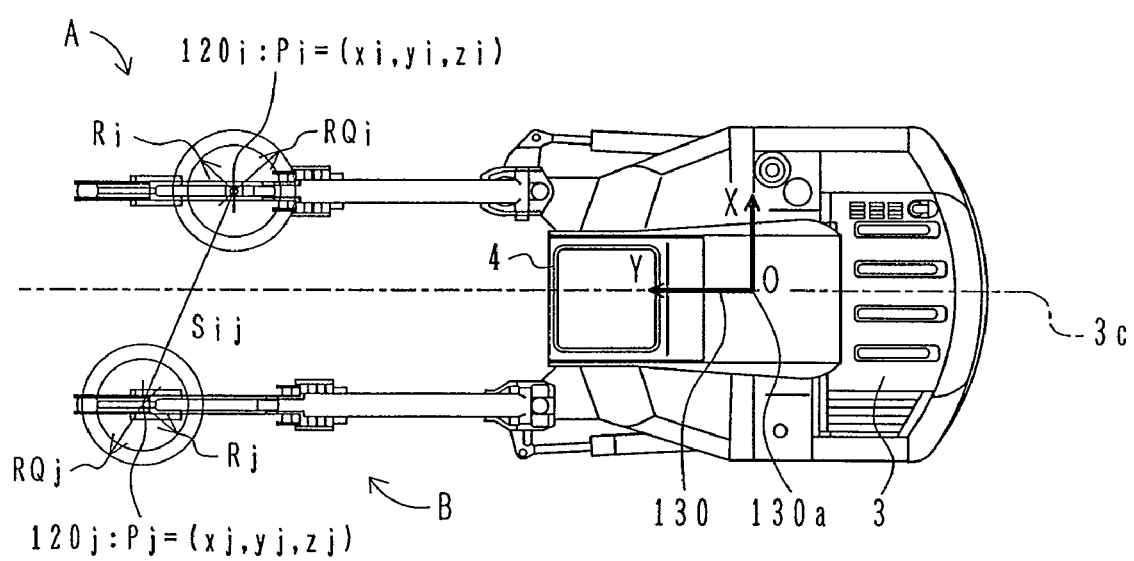
FIG. 17 is a plan view that shows the appearance of the double-arm working machine according to the second embodiment of the present invention.

FIG. 16 is a side view that shows external appearance of the double-arm working machine according to the second embodiment of the present invention. FIG. 17 is a plan view of the double-arm working machine.

In step 1, as illustrated by way of example in FIGS. 16 and 17, the quantities and positions of interference prevention reference points 120 to become the basis for interference prevention control are set for the work fronts A, B (i.e., the booms 10a, 10b, the arms 12a, 12b, and the grapples 20a, 20b). Alternatively, these values may be preset.

For example, the quantities of interference prevention reference points 120 on the work fronts A and B are set as "m" and "n", respectively. Also, an interference danger radius and semi-interference danger radius of a virtual sphere with a center at an interference prevention reference point 120i (i=0, 1, 2 . . . m) on the first work front A are set as Ri (i=0, 1, 2 . . . m) and RQi (i=0, 1, 2 . . . m, RQi>Ri), respectively. Additionally, an interference danger radius and semi-interference danger radius of a virtual sphere with a center at an interference prevention reference point 120j (j=0, 1, 2 . . . n) on the second work front B are set as Rj (j=0, 1, 2 . . . n) and RQj (j=0, 1, 2 . . . n, RQj>Rj), respectively.

The interference danger radius Ri or Rj here refers to a radius at which the work fronts A, B are liable to come into contact with each other if the interference danger radius of one work front interferes with that of the other work front. In the present embodiment, the work fronts A, B assume such a state that the work fronts are surrounded by a tubular virtual space formed by linking the virtual spheres of the radii Ri, Rj with the interference prevention reference points 120i, 120j as the respective centers. The range of such a 3D-like work front positional relationship that makes the tubular virtual space interfere with the similar virtual space of the other work front becomes the interference danger area N.

Additionally, the interference danger area N assumes such a state that the area N is surrounded by another tubular virtual space formed by linking the virtual spheres of the radii Ri, Rj with the interference prevention reference points 120i, 120j as the respective centers. The range of such a three-dimensional work front positional relationship that makes the tubular virtual space interfere with the similar virtual space of the other work front becomes the semi-interference danger area M. That is to say, the semi-interference danger area M is adjacent to and surrounds the interference danger area N.

Other areas, that is, areas of a positional relationship in which the work fronts A, B are likely not at all to come into contact with each other are collectively defined as the normal area L. The definitions of the interference danger area N, the semi-interference danger area M, and the normal area L, will be described in further detail later herein using FIG. 18.

<Step 2: Position Coordinates of Interference Prevention Reference Points>

First, a fundamental coordinate system 130 is provided on the upper swing structure 3. In the present embodiment, as shown, a point intersecting with a lower face of the upper swing structure 3, on a swing centerline 3a thereof, is set as an origin 130a of the fundamental coordinate system. As shown, coordinate axes are taken with the fundamental coordinate system origin 130a as an origin of the axes. That is to say, an X-axis is taken in a rightward direction of the upper swing structure 3, a Y-axis in a forward direction, and a Z-axis in an upward direction.

Next, position coordinates of all interference prevention reference points 120i, 120j in the fundamental coordinate system 130 are calculated from the sensor signals sent from the angle sensors 67a, 67b, 68a, 68b, 69a, 69b, 70a, 70b of the work fronts A, B. The calculated position coordinates of each interference prevention reference point 120i for the first work front A, in the fundamental coordinate system 130, are defined as Pi (xi, yi, zi), and the calculated position coordinates of each interference prevention reference point 120j for the second work front B, as Pj (xj, yj, zj).

<Step 3: Distances Between Reference Points>

Distances "sij" from all interference prevention reference points 120i on the first work front A to all interference prevention reference points 120j on the second work front B where front-to-front contact is likely to occur are calculated from the above-defined position coordinates Pi, Pj. The calculations are conducted for each interference prevention reference point 120i.

Each distance "sij" is calculated as "$sij=|Pi-Pj|=\{(xi-xj)^2+(yi-yj)^2+(zi-zj)^2\}^{1/2}$". Next, the interference prevention reference points 120i, 120j at which a differential obtained as "Sij−(Ri+Rj)" by subtracting a sum total (Ri+Rj) of interference danger radii from the reference point—reference point distance "Sij" becomes a minimum are extracted and the distance "Sij" between the two associated reference points is expressed as the shortest distance "Sm" between reference points.

<Step 4: Interference Area Discrimination>

Figure 18:
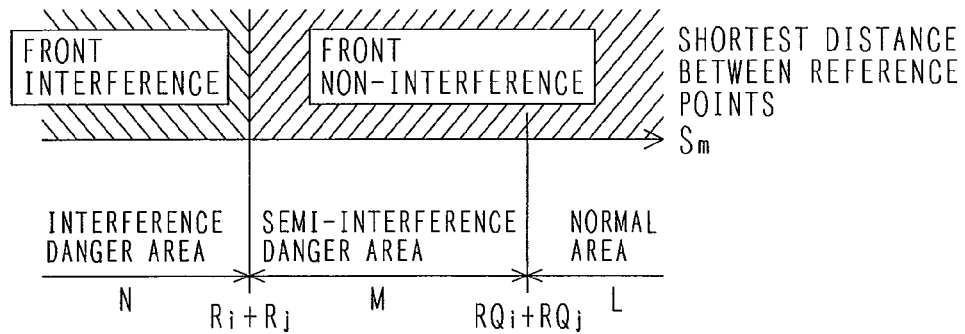
FIG. 18 is a conceptual diagram that shows a relationship between the shortest distance from one reference point on the left/right work front to another reference point, and left/right work front interference/non-interference, in the double-arm working machine according to the second embodiment of the present invention.

FIG. 18 is a conceptual diagram that shows a relationship between the shortest distance from one reference point on the left/right work front to another reference point, and left/right work front interference/non-interference.

The above-described normal area L, semi-interference danger area M, and interference danger area N that have been defined as in FIG. 18 are stored within the interference prevention controller 61F. The area in which the distance between the two extracted interference prevention reference points, 120i, 120j, namely, the shortest distance "Sm" between reference points becomes equal to or smaller than the sum total (Ri+Rj) of the interference danger radii, that is, the area in which "Sm≦(Ri+Rj)" holds is defined as an interference danger area N. Also, the area in which the shortest distance "Sm" between reference points becomes greater than the sum total (Ri+Rj) of the interference danger radii and equal to or smaller than a sum total (RQi+RQj) of semi-interference danger radii, that is, the area in which "(Ri+Rj) <Sm≦(RQi+RQj)" holds is defined as the semi-interference danger area M. The area in which the shortest distance "Sm" between reference points becomes greater than the sum total (RQi+RQj) of the semi-interference danger radii, that is, the area in which "Sm>(RQi+RQj)" holds is defined as a normal area L.

Even if the shortest distance "Sm" between reference points becomes greater than the sum total (RQi+RQj) of the semi-interference danger radii and the associated area is discriminated as a normal area L above, when the work fronts A, B are crossing each other laterally, that is, when the x-coordinate "xi" of the interference prevention reference point 120j on the second work front B becomes greater than the x-coordinate "xj" of the interference prevention reference point 120i on the first work front A and "(xi−xj)<0" holds, the area in which this relationship in position between the work fronts A, B may be discriminated as a semi-interference danger area M.

If the shortest distance "Sm" between reference points becomes equal to or smaller than the sum total (RQi+RQj) of the semi-interference danger radii, that is, all areas in which "Sm≦(RQi+RQj)" holds may be defined as semi-interference danger areas, and interference danger areas may be omitted.

<Step 5: Output Signal Generation Based on Interference Area Discrimination>

Figure 19:
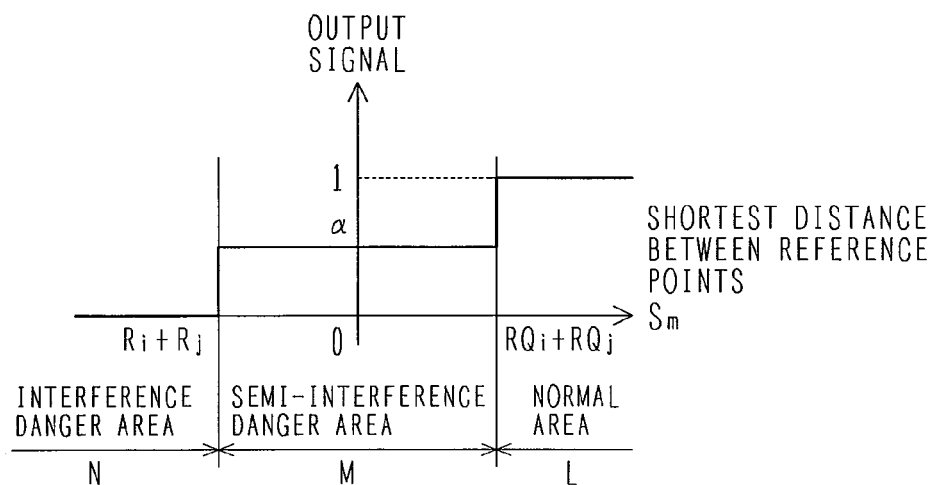
FIG. 19 is a diagram showing an example of a relationship between the interference prevention controller output signal level and shortest distance from one reference point to another, obtained for the left/right work front during swinging thereof for relative approaching in the double-arm working machine according to the second embodiment of the present invention.

FIG. 19 is a diagram showing an example of a relationship between the output signal level of the interference prevention controller 61FA and shortest distance "Sm" from one reference point to another, obtained for the left/right work front during swinging thereof for relative approaching. A horizontal axis denotes the shortest distance "Sm" from one reference point to another, and a vertical axis denotes the output signal. This output signal is already made dimensionless. In the example of FIG. 19, when the shortest distance "Sm" decreases to lie in the interference danger area N, the value of the output signal which is an operating instruction for reduction in the shortest distance "Sm" is reduced by a certain ratio of α (0<α<1), whereby, among all cylinders 9a, 9b, 11a, 11b, 13a, 13b, 15a, 15b, only those associated with the work front on which the shortest distance "Sm" is to be reduced are reduced in operating speed. Next, the sequences that the interference prevention controller 61FA uses to compute the output signals in each area are described below.

i) Normal Area L

When the shortest distance "Sm" between reference points on the work front A, B lies in the normal area L, the interference prevention controller 61FA directly transmits the output signal to the associated driving signal generator without subtracting the output signal value that has been computed using the input signals sent from the position change sensors 57a, 57b, 581a, 581b, 582a, 582b, 59a, 59b, 60a, 60b of the operating device 50a, 50b.

ii) Semi-Interference Danger Area M

When the shortest distance "Sm" between reference points on the work front A, B lies in the semi-interference danger area M and the input signal from the position change sensor 57a, 57b, 581a, 581b, 582a, 582b, 59a, 59b, 60a, 60b is a signal that reduces the shortest distance "Sm", that is, a signal that makes the work fronts A, B approach each other, the interference prevention controller 61FA subtracts the output signal value that has been computed using the input signals obtained from the position change sensors 57a, 57b, 581a, 581b, 582a, 582b, 59a, 59b, 60a, 60b, and transmits the output signal to the associated driving signal generator.

Conversely, even when the shortest distance "Sm" between reference points on the work front A, B lies in the semi-interference danger area M, if the input signal from the position change sensor 57a, 57b, 581a, 581b, 582a, 582b, 59a, 59b, 60a, 60b is a signal that increases the shortest distance "Sm", that is, a signal that moves the work fronts A, B away from each other, the interference prevention controller 61FA directly transmits the output signal to the associated driving signal generator without subtracting the output signal value that has been computed using the input signals obtained from the position change sensors 57a, 57b, 581a, 581b, 582a, 582b, 59a, 59b, 60a, 60b.

iii) Interference Danger Area N

When the shortest distance "Sm" between reference points on the work front A, B lies in the interference danger area N and the input signal from the position change sensor 57a, 57b, 581a, 581b, 582a, 582b, 59a, 59b, 60a, 60b is the signal that reduces the shortest distance "Sm", that is, the signal that makes the work fronts A, B approach each other, the interference prevention controller 61FA generates output signals that stop the operation of the work fronts A, B and outputs the generated signals to the associated driving signal generators. In this case, of all output signals to each associated driving signal generator, only an operation-stopping signal containing a directional component which makes the work fronts A, B approach each other may be generated and output.

However, even when the shortest distance "Sm" between reference points on the work front A, B lies in the interference danger area N, if the input signal from the position change sensor 57a, 57b, 581a, 581b, 582a, 582b, 59a, 59b, 60a, 60b is the signal that increases the shortest distance "Sm", that is, the signal that moves the work fronts A, B away from each other, the interference prevention controller 61FA directly transmits the output signal to the associated driving signal generator without subtracting the output signal value that has been computed using the input signals obtained from the position change sensors 57a, 57b, 581a, 581b, 582a, 582b, 59a, 59b, 60a, 60b.

<Selecting Whether to Make Interference Prevention Control Effective or Ineffective>

It is possible to construct the interference prevention controller 61FA in the present embodiment so that whether to make interference prevention control effective or ineffective can be selected using the input signal obtained from the interference preventing control 110 provided in the cabin 4. It is also possible to adopt the construction that allows selection of the interference prevention control function in the first embodiment or the interference prevention control function in the present (second) embodiment, not only on/off selection of interference prevention control.

<Operational Effects>

Advantageous effects similar/equivalent to those of the first embodiment can also be obtained in the present (second) embodiment of the double-arm working machine which operates as described above. In the first embodiment, irrespective of the postures of the work fronts A, B, the swinging speed of either work front has also been controlled according to the particular differential angle between the work fronts A. B. In this case, even if the position coordinates of the work fronts A, B deviate vertically and enter the interference danger area N, the swinging speed of the work front A, B may be suppressed and this may occur, even when the work fronts A, B are not in contact. According to the present (second) embodiment, however, since the operating speed of the work front A, B is controlled considering not only the differential angle therebetween, but also the posture thereof, this control function prevents the occurrence of the inconvenience that in spite of the work fronts A, B being unlikely to come into contact, two-dimensional judgment on interference/non-interference slows down (or stops) the operation of the work front A, B.

The above does not describe which of the work fronts A, B has its swinging speed reduced during the interference prevention control, but for example, if both work fronts A, B are operated to swing, when both approach each other, the swinging speeds of both may be reduced, or if both are operated to swing in the same direction and both approach each other according to a particular difference in swinging speed, the swinging speeds of both may be reduced or the operating speed of one work front swinging towards the other work front may be reduced. Needless to say, if one work front does not swing and only the other work front swings and approaches, this latter work front is reduced in swinging speed. For example, not only if the work fronts A, B approach during swinging, but also if both under a laterally crossing state interfere with each other vertically during vertical operation, the vertical operation is slowed down and, if necessary, stopped.

In addition, the signal level of the output signal which the interference prevention controller 61FA transmits when the relationship in position between the work fronts A, B exists in the semi-interference danger area M is not limited to/by the aspect shown in FIG. 9 (i.e., reduction ratio "α" is fixed), and this reduction ratio may be lowered stepwise or any one of the aspects described as examples below may be employed.

<First Modification>

Figure 20:
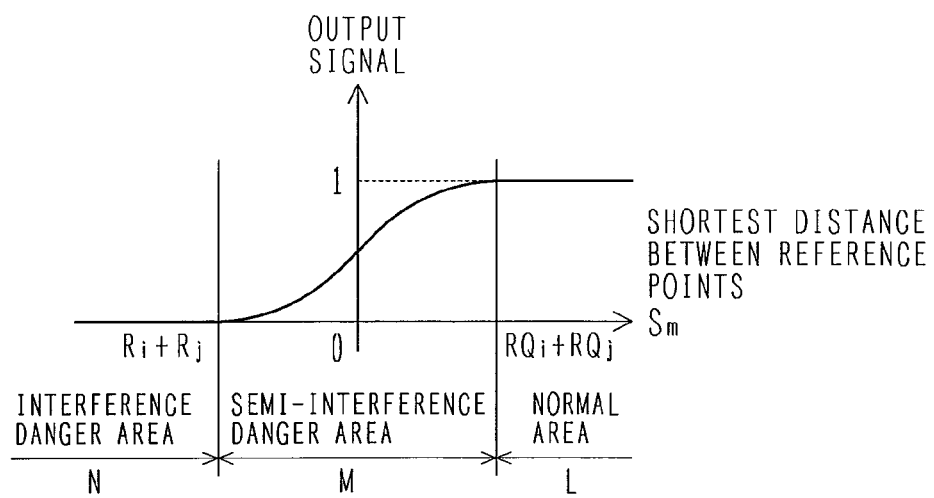
FIG. 20 is a diagram showing another example of a relationship between the interference prevention controller output signal level and shortest distance from one reference point to another, obtained for the left/right work front during swinging thereof for relative approaching in the double-arm working machine according to the second embodiment of the present invention.

FIG. 20 is a diagram showing another example of a relationship between the interference prevention controller 61FA output signal level and shortest distance from one reference point to another, obtained for the left/right work front during swinging thereof for relative approaching. The horizontal and vertical axes shown in FIG. 20 denote the same as in FIG. 19.

In the example of FIG. 20, the output signal in the semi-interference danger area M is set to continuously decrease from 1 to 0 (zero) as the signal approaches the interference danger area N, and particularly in the present example, the above relationship is defined by a nonlinear curve free of a discontinuous point. In the present example, as the relationship in position between the work fronts A, B approaches the interference danger area N, the relative speed at which one work front approaches the other work front will be suppressed, so the swing post cylinder 9a, 9b can be stopped more gently than in the example of FIG. 19. In addition, if, as in the present example, the relationship between the shortest distance "Sm" and the output signal is defined using a nonlinear curve free of a discontinuous point, to stop the swing operation of the work fronts A, B more smoothly and more gently.

<Second Modification>

FIG. 21 is a diagram showing yet another example of a relationship between the interference prevention controller 61FA output signal level and shortest distance from one reference point to another, obtained during left/right work front swinging for relative approaching. The horizontal and vertical axes shown in FIG. 21 denote the same as in FIG. 19.

In the example of FIG. 21, the output signal in the semi-interference danger area M is also set to continuously decrease from 1 to 0 (zero) as the signal approaches the interference danger area N. In the present example, the above relationship is defined by a linear curve having a definite gradient, and a connection point with respect to the output signal in the normal area L/interference danger area N is discontinuous. In the working machine of such construction, as the relationship in position between the work fronts A, B approaches the interference danger area N, the relative speed at which one work front approaches the other work front will also be suppressed, so the work front A, B can be stopped more gently than in the example of FIG. 19.

<Third Modification>

Figure 24:
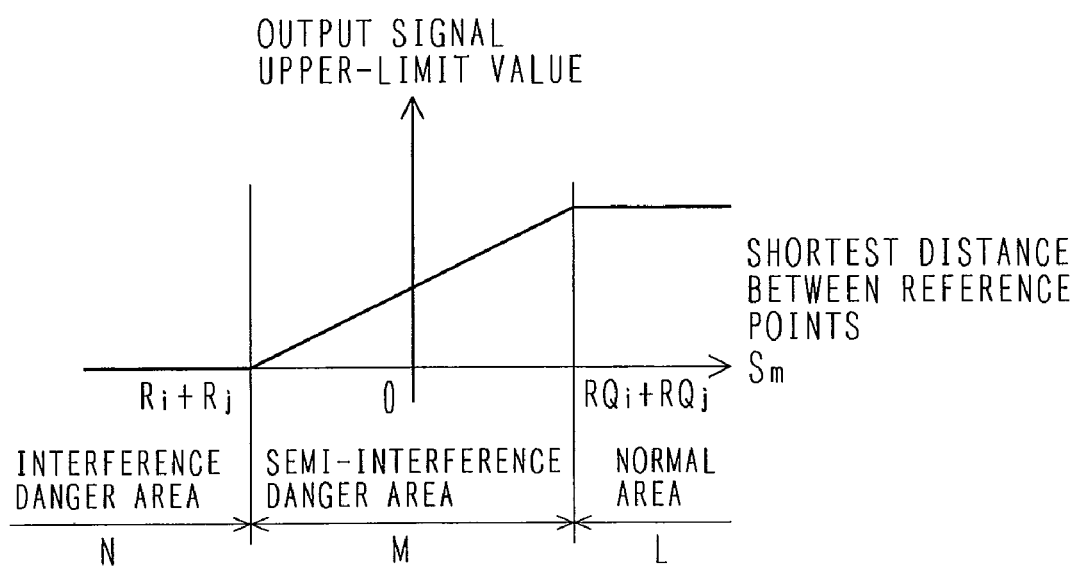
FIG. 24 is a diagram showing a further example of a relationship between the interference prevention controller output signal level and shortest distance from one reference point to another, obtained for the left/right work front during swinging thereof for relative approaching in the double-arm working machine according to the second embodiment of the present invention.

FIGS. 22 to 24 are diagrams that show further examples of a relationship between the interference prevention controller 61FA output signal level and shortest distance from one reference point to another, obtained during work front swinging for relative approaching. In each of these figures, a horizontal axis denotes the shortest distance "Sm" between reference points, as in FIG. 19, and a vertical axis denotes an upper-limit value of the output signal.

In the examples of FIGS. 19-21, the output signal that has been calculated according to the particular input signal level in the semi-interference danger area M is multiplied by a coefficient to reduce the operating speed, whereas, in the examples of FIGS. 22-24, an upper-limit value of the operating speed is set to be as shown in either figure, and the operating speed of the work front A, B in the semi-interference danger area M is limited and reduced. How great the manipulated variable is, the output signal is controlled to stay within the upper limit. Essentially the same advantageous effects as obtained in the examples of FIGS. 19-21 can be obtained by using the above method.

The above-described modifications have assumed the examples in which, after operational slowdown of the work front in the semi-interference danger area M, both work fronts are stopped if interference between the work fronts in the interference danger area N is still likely. However, for example, if interference between the work fronts is still likely even after the operational slowdown, the interference may be avoidable by changing the operating direction(s) of one or both of the work fronts. For example, if the work fronts A, B interfere during swinging, the interference can be avoided by assigning (or increasing) an operating speed of a directional (vertical) component orthogonal to the operating direction, and shifting vertically the positional relationship between the work fronts A, B. If the work fronts A, B interfere during vertical swaying, the interference can, of course, be avoided by assigning (or increasing) a swinging speed which moves the work fronts A, B away from each other, and shifting laterally the positional relationship between the work fronts A, B.

In addition, although the above-described modifications have assumed the examples in which the operation of the work fronts A, B is specified using the operating device 50a, 50b located in the cabin 4, the operator when present outside the cabin 4 may use a wireless-controlled type of operating device to operate the work fronts A, B. The present invention is also applicable to this case, and when the invention is actually applied, advantageous effects similar/equivalent to those of the above modifications can be obtained.

The invention claimed is:

1. A double-arm working machine comprising:
a lower travel structure with a travel device;
an upper bodywork that is provided at an upper section of the lower travel structure and includes an operator cabin;
left and right swing posts provided on front left and right sides of the upper bodywork such that the swing posts each swing in both leftward and rightward directions;
left and right work arms provided on the left and right swing posts such that the work arms each sway vertically; and
operating devices which each give an operational instruction to the swing posts and the work arms;
the working machine further comprising:
angle sensors which each sense a swinging angle of the left or right swing post; and
a control system previously storing a first threshold value and a second threshold value for discriminating a positional relationship between the left and right work arms, the control system which, pursuant to a differential angle between the left and right work arms that has been calculated from sensor signals sent from the angle sensors, and to command signals from the operating devices, generates an output signal to swing the swing post, wherein the control system includes:

an interference prevention controller constructed such that:

when the calculated differential angle is below the first threshold value, the controller defines, as an interference danger area, a differential angle range in which the left and right work arms are likely to come into contact with each other;

when the calculated differential angle is larger than the first threshold value and below the second threshold value, the controller defines, as a semi-interference danger area, a differential angle area adjacent to the interference danger area and in which the left and right work arms, although kept free from contact under a stopped state thereof, are liable to come into contact when operated to make relative approaches;

when the calculated differential angle is larger than the second threshold value, the controller defines, as a normal area in which the interference between the work arms is unlikely, regardless of their operating states; and when a positional relationship between the left and right work arms is present in the semi-interference danger area and the work arms are operated to make relative approaches, the controller outputs a signals to reduce the swinging speed of the swing posts; and a driving signal generator which, on the basis of the output signals from the controller, generates and outputs driving signals to driving units of the swing posts.

2. A double-arm working machine comprising:

a lower travel structure with a travel device;

an upper bodywork that is provided at an upper section of the lower travel structure and includes an operator cabin;

left and right swing posts provided on front left and right sides of the upper bodywork such that the swing posts each swing in both leftward and rightward directions;

left and right work arms provided on the left and right swing posts such that the work arms each sway vertically; and operating devices which each give an operational instruction to the swing posts and the work arms;

the working machine further comprising:

angle sensors which each sense a swinging angle of the left or right swing post;

angle sensors which each sense a vertical pivoting angle of the left or right work arm; and a control system previously storing: reference points set for each of the two work fronts; radiuses of first virtual spheres with centers at the reference points respectively; and radiuses of second virtual spheres being concentric with and larger than the first virtual spheres respectively, the control system which, pursuant to a differential angle between the left and right work arms that has been calculated from sensor signals sent from the angle sensors, to postures of the work arms, and to command signals from the operating device, generates an output signal to drive the swing posts and the work arms;

wherein the control system comprises:

an interference prevention controller constructed such that:

when any one of the first virtual spheres of one work arm interferes with any one of the first virtual spheres of the other work arm, the controller defines, as an interference danger area, a distance range in which the left and right work arms are likely to come into contact with each other;

when any one of the second virtual spheres of one work arm interferes with any one of the second virtual spheres of the other work arm, the controller defines, as a semi-interference danger area, a distance range adjacent to the interference danger area and in which both work arms, although kept free from contact under a stopped state thereof, are liable to come into contact when operated to make relative approaches;

when all of the second virtual spheres of one work arm do not interfere with any one of the second virtual spheres of the other work arm, the controller defines, as a normal area in which the interference between the work arms is unlikely, regardless of their operating states; and when a positional relationship is present in the semi-interference danger area and the work arms are operated to make relative approaches, the controller outputs signals to reduce the operating speed of the swing posts and the work arms associated with the shortest distance between both work arms calculated using the sensor signals sent from the angle sensors, which is to be reduced; and driving signal generators which, on the basis of the output signals from the controller, generates and outputs driving signals to driving units of the swing posts and the work arms.

3. The double-arm working machine according to claim 1, wherein:

when the positional relationship between the work arms, calculated beforehand from the sensor signals sent from the angle sensors, is present in the semi-interference danger area and the left and right work arms approach each other, the interference prevention controller increases a slowdown rate of the work arms continuously or stepwise as the work arms approach.

4. The double-arm working machine according to claim 1, wherein:

when the positional relationship between the work arms is present in the interference danger area and an operating signal that makes the left and right work arms approach each other is input from the operating device, the interference prevention controller avoids interference between the work arms by stopping the approaching operation of the work arms.

5. The double-arm working machine according to claim 1, wherein:

when the positional relationship between the work arms is present in the interference danger area and an operating signal that makes the left and right work arms approach each other is input from the operating device, the interference prevention controller avoids interference between the work arms by changing an operating direction of the work arms.

* * * * *